United States Patent
Kolze et al.

(10) Patent No.: US 8,437,406 B2
(45) Date of Patent: May 7, 2013

(54) METHOD AND SYSTEM FOR DIGITAL VIDEO BROADCAST FOR CABLE (DVB-C2)

(75) Inventors: Thomas Kolze, Phoenix, AZ (US); Robbert van der Wal, Leersum (NL); Bruce Currivan, Dove Canyon, CA (US)

(73) Assignee: Broadcom Corporation, Irvine, CA (US)

( * ) Notice: Subject to any disclaimer, the term of this patent is extended or adjusted under 35 U.S.C. 154(b) by 1211 days.

(21) Appl. No.: 12/269,865

(22) Filed: Nov. 12, 2008

(65) Prior Publication Data

US 2009/0122874 A1   May 14, 2009

Related U.S. Application Data

(60) Provisional application No. 60/987,371, filed on Nov. 12, 2007.

(51) Int. Cl.
*H04N 7/12* (2006.01)
*H04N 11/02* (2006.01)
*H04J 3/24* (2006.01)
*H03M 13/00* (2006.01)
*A61F 2/48* (2006.01)

(52) U.S. Cl.
USPC ............. 375/240.24; 375/240.16; 370/473; 714/752; 714/758; 714/776; 714/804

(58) Field of Classification Search ............. 375/240.24, 375/240.16; 370/473; 714/752, 758
See application file for complete search history.

(56) References Cited

U.S. PATENT DOCUMENTS

| | | | | |
|---|---|---|---|---|
| 7,831,887 B2* | 11/2010 | Joyce et al. | | 714/758 |
| 2005/0251725 A1* | 11/2005 | Huang et al. | | 714/752 |
| 2008/0225892 A1* | 9/2008 | Vare et al. | | 370/473 |
| 2011/0258510 A1* | 10/2011 | Watson et al. | | 714/752 |

FOREIGN PATENT DOCUMENTS

WO   WO 2007134196 A2 * 11/2007

OTHER PUBLICATIONS

Kratochvil, T.; "The DVB television signal transmission simulation using the forward error correction codes"; Applied Electromagnetics and Communications, 2003. ICECom 2003. 17th International Conference on Topic(s): Communication, Networking & Broadcasting; Fields, Waves & Electromagnetics; Oct. 2003; pp. 113-116.*

* cited by examiner

*Primary Examiner* — Andrew L Nalven
*Assistant Examiner* — Courtney Fields
(74) *Attorney, Agent, or Firm* — McAndrews Held & Malloy, Ltd

(57) ABSTRACT

Methods and systems for DVB-C2 are disclosed and may include receiving data encoded utilizing variable encoding, variable modulation and outer codes via a physical layer matched to a desired quality of service. An error probability may be determined for said received data and retransmission of portions of said data with error probability above an error threshold may be requested. The variable modulation may include single carrier modulation, orthogonal frequency division modulation, synchronous code division multiple access, and/or from 256 QAM to 2048 QAM or greater. The variable encoding may include forward error correction code, which may include low density parity check code.

54 Claims, 12 Drawing Sheets

PRIOR ART

METHOD AND SYSTEM FOR DIGITAL VIDEO BROADCAST FOR CABLE (DVB-C2)

CROSS-REFERENCE TO RELATED APPLICATIONS/INCORPORATION BY REFERENCE

This application makes reference to and claims priority to, and claims the benefit of U.S. Provisional Application Ser. No. 60/987,371 filed on Nov. 12, 2007.

This application also makes reference to:
U.S. patent application Ser. No. 10/237,853 filed on Sep. 9, 2002;
U.S. patent application Ser. No. 10/388,473 filed on Mar. 17, 2003;
U.S. patent application Ser. No. 10/175,330 filed on Jun. 20, 2002;
U.S. patent application Ser. No. 11/798,439 filed on May 14, 2007;
U.S. Pat. Nos. 7,308,050;
6,690,753;
7,142,618;
7,050,516;
7,110,434;
7,215,700;
7,236,545;
7,190,710;
7,197,096;
6,798,854;
7,218,694;
7,418,061;
7,415,061;
7,366,258; and
the DOCSIS 3.0 family of specifications, including SP-PHYv3.0 and SP-MULPIv3.0.

Each of the above stated patents, applications, or specifications is hereby incorporated herein by reference in its entirety.

FEDERALLY SPONSORED RESEARCH OR DEVELOPMENT

[Not Applicable]

MICROFICHE/COPYRIGHT REFERENCE

[Not Applicable]

FIELD OF THE INVENTION

Certain embodiments of the invention relate to processing of multimedia signals. More specifically, certain embodiments of the invention relate to a method and system for DVB-C2.

BACKGROUND OF THE INVENTION

Broadcasting and telecommunications have historically occupied separate fields. In the past, broadcasting was largely an "over-the-air" medium while wired media carried telecommunication signals. In today's communication environment, this distinction no longer applies as both broadcast and telecommunication content are delivered over optical, wired and/or wireless media. For example, broadcasts from traditional television (TV) broadcasters are now delivered over the air, via satellite, via cable, via the Internet, and via cellular communication. The infrastructure traditionally utilized for transporting cable television content has been modified to enable simultaneous communication of multimedia content comprising video, data and voice communication in addition to broadcasting. In addition, traditional cable television infrastructure has to be modified to enable high speed uplink communication from set-top boxes (STBs) to the cable headend.

Communication systems may utilize forward error correction (FEC) code to control errors in transmitted data due to burst noise, for example. FEC involves adding extra bits into a data stream before transmission. These extra bits may be used at the receive end for detecting and correcting errors. Examples of FEC methods include block codes, and convolutional codes. Exemplary block codes comprise cyclic codes, and Reed-Solomon (RS) codes, Digital video broadcasting (DVB) comprises a number of standards that enable the broadcasting of video. Exemplary DVB standards comprise digital video broadcast via satellite (DVB-S), digital video broadcast via terrestrial television (DVB-T), digital video broadcast for terrestrial handheld devices (DVB-H), and digital video broadcast for cable television (DVB-C). The differences between the standards are primarily in their infrastructure and the type of modulation and error correction schemes that are utilized for processing and transmitting the broadcast content.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for DVB-C2, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for DVB-C2. Exemplary aspects of the invention may comprise receiving, in a DVB-C2 downstream transmission, data encoded utilizing variable encoding, variable modulation and outer codes via a physical layer matched to a desired quality of service. An error probability may be determined for the received data and retransmission of portions of the data with error probability above an error threshold may be requested. The variable modulation may comprise single carrier modulation, orthogonal frequency division modulation, synchronous code division multiple access, and/or 256 QAM to 2048 QAM. Various embodiments of the invention are also operable to utilize constellation greater than 2048 QAM. The variable encoding may comprise forward error correction code, which may comprise low density parity check code (LDPCC).

Another exemplary embodiment of the invention may comprise coding multimedia information for transmission in a digital video broadcast cable system, wherein the coding utilizes a block code as an outer code for forward error correction. The multimedia information may comprise voice, video, data, and/or still images. A low density parity check code or Reed-Solomon (RS) code may be utilized as the block code for the outer code for the forward error correction. The multimedia information may be block encoded by the block coder utilizing the block code. The block encoded multimedia information may be outer interleaved by the outer interleaver, based on for example, a block size of the outer code. The outer interleaved block encoded multimedia information may be inner coded by the inner coder, utilizing for example, convolutional coding. The inner coded outer interleaved block encoded multimedia information may be inner interleaved by the inner interleaver 408. The inner interleaved inner coded outer interleaved block encoded multimedia information may be modulated via a variable modulation scheme by the modulator 401.

Figure 1:
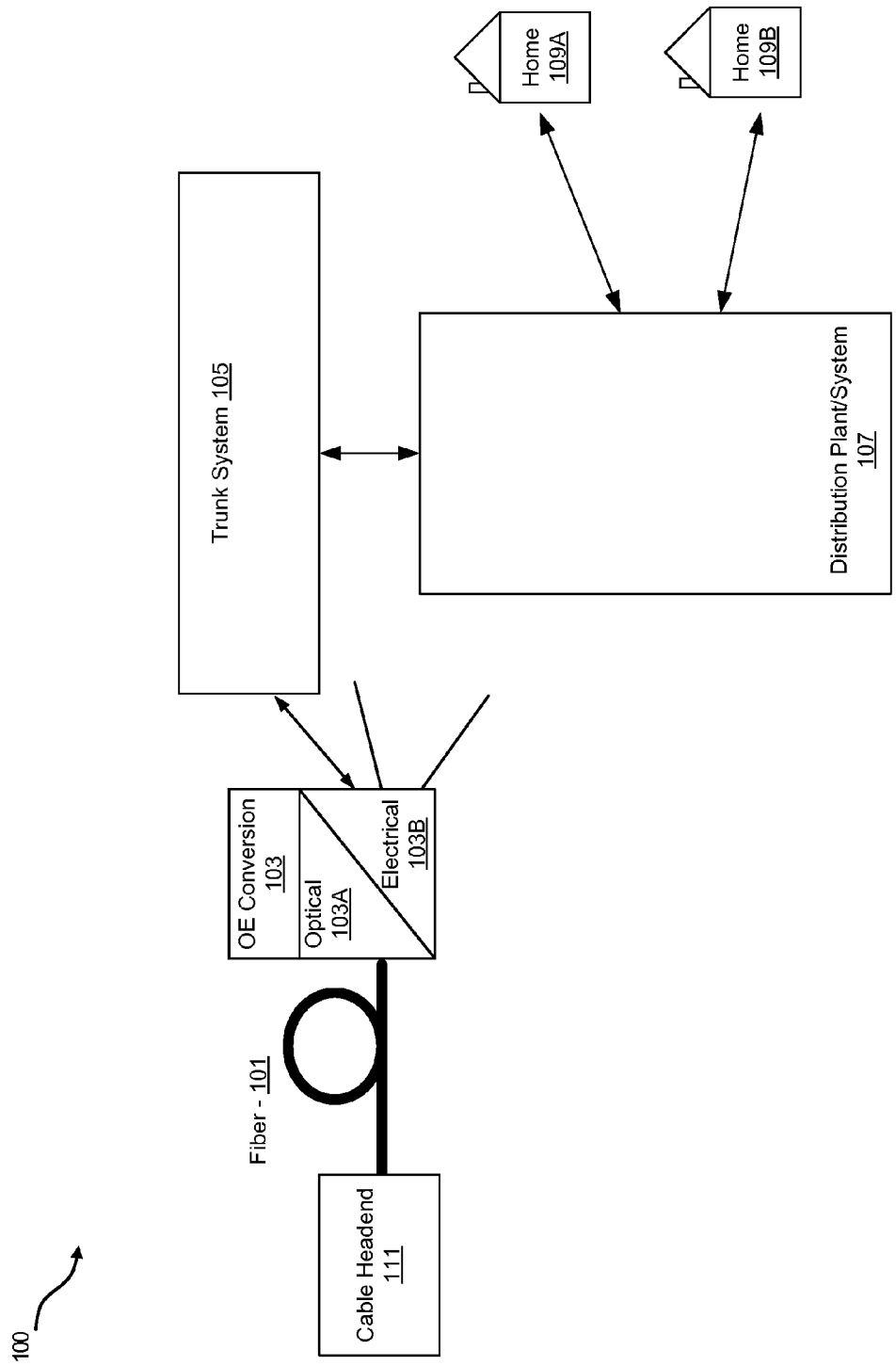
FIG. 1 is a block diagram of an exemplary cable television broadcast system, which may be utilized in accordance with an embodiment of the invention.

FIG. 1 is a block diagram of an exemplary cable television broadcast system, which may be utilized in accordance with an embodiment of the invention. Referring to FIG. 1, there is shown a cable television system 100 comprising optical fiber 101, an optoelectronic (OE) conversion module 103, trunk system 105, distribution system 107, homes 109A and 109B, and a cable headend 111. The OE conversion module 103 may comprise an optical side 103A and an electrical side 103B.

The optical fiber 101 may comprise one or more optical fibers and associated components for transmitting optical signals. In an embodiment of the invention, the optical fiber 101 may comprise a high bandwidth transmission media for transmitting data to and from a cable headend to a local distribution system.

The OE conversion module 103 may comprise suitable circuitry, logic, and/or code that may be enabled to convert optical signals received via the optical fiber 101 into electrical signals, and to convert received electrical signals into optical signals that may be transmitted via the optical fiber 101. The optical side 103A may comprise suitable optical components that may be enabled to process optical signals, such as attenuation, splitting, filtering, amplification, and/or conversion to electrical signals, for example. The electrical side 103B may comprise suitable circuitry, logic, and/or code that may be enabled to process electrical signals, such as filtering, amplification, and/or conversion to optical signals, for example.

The trunk system 105 may comprise suitable circuitry, logic, and/or code that may be enabled to amplify signals received from the OE conversion module 103. The distribution system 107 may comprise suitable circuitry, logic, and/or code that may be enabled to amplify signals received from the trunk system 105. A number of distribution branches, such as the branch indicated by the distribution system 107, may branch off from trunks, such as the trunk embodied by the trunk system 105. In the cable television system 100, the noise may be dominated by the trunk system 105, and distortion may be dominated by the distribution system 107.

The cable headend 111 may comprise suitable circuitry, logic, and or code that may be operable to supply signals for the cable television system 100. The cable headend 111 may enable forward error correction, retransmission of errored bits, burst noise mitigation, variable modulation, variable coding, and PHY configurable to QoS, for example.

In operation, the cable headend 111 may communicate optical signals that may be communicated via the optical fiber 101. The optical signals may be converted to electrical signals by the OE conversion module 103 and subsequently amplified by one or more of the trunk system 105. The amplified signals may be communicated to one or more of the distribution system 107, before being communicated to the home 109.

Similarly, signals may be communicated from the home 109 to the distribution system 107, to the trunk system 105, to the OE conversion module 103, converted to optical signals and communicated via the optical fiber 101. In this manner, two way communication of data, voice, video, and/or other signals may be enabled.

In an embodiment of the invention, DVB-C2 may be utilized to ensure desired signal quality and error correction, for example. Exemplary DVB-C2 techniques may comprise retransmission, variable coding, outer code, variable modulation schemes, and matching of the physical layer (PHY) to the desired quality of service (QoS), for example.

Figure 2:
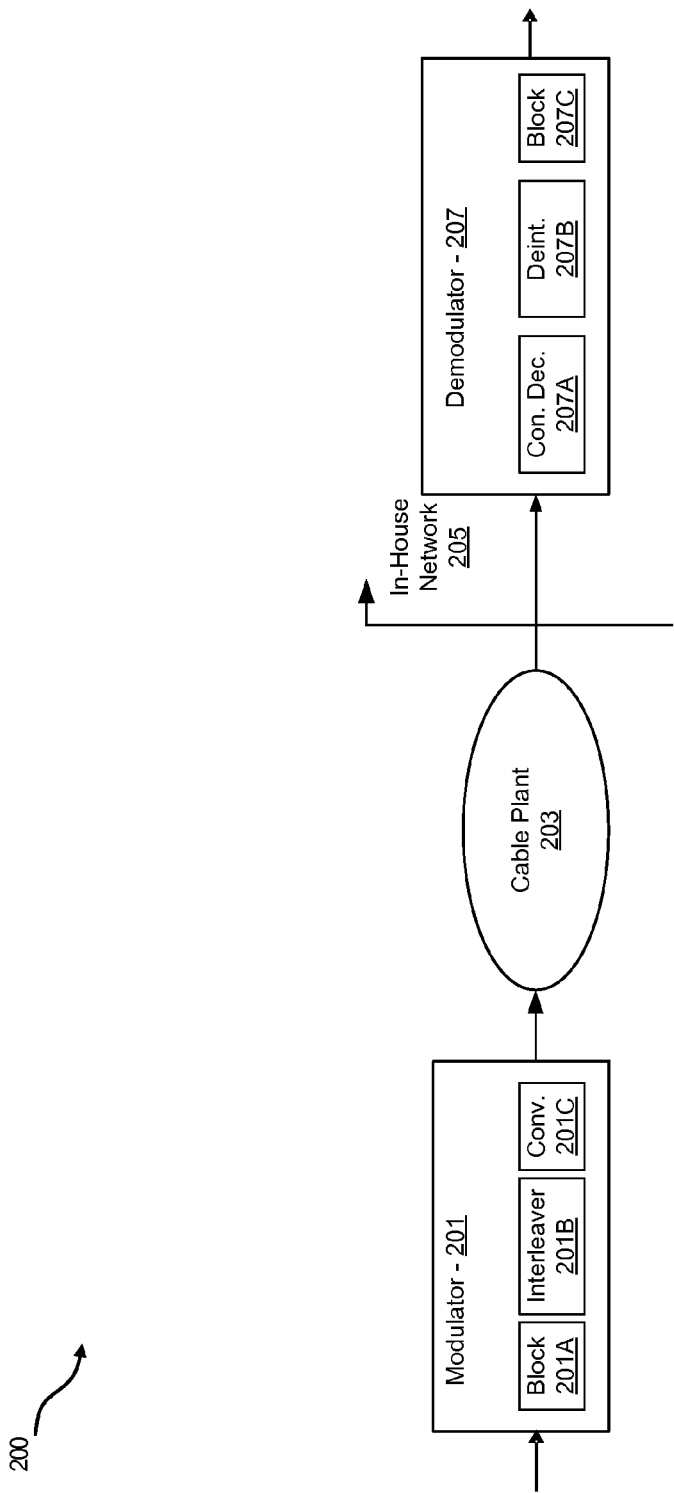
FIG. 2 is a block diagram illustrating an exemplary downstream transmission path, in accordance with an embodiment of the invention.

FIG. 2 is a block diagram illustrating an exemplary downstream transmission path, in accordance with an embodiment of the invention. Referring to FIG. 2, there is shown a downstream transmission 200 comprising a modulator 201, a cable plant 203, and an in-house network 205 comprising a demodulator 207.

The modulator 201 may comprise suitable circuitry, logic, and/or code that may be enabled to modulate a signal to be communicated to the in-house network 205 via the cable plant 203. The modulator 201 may comprise forward error correction (FEC) components comprising a block encoder 201A, an interleaver 201B, and a convolution encoder 201C. The block encoder 201A may be enabled to utilize an outer code such as a low density parity check code (LDPCC) or Reed-Solomon (RS) code, for example. The interleaver 201B may comprise suitable circuitry, logic, and/or code that may enable interleaving blocks of data with variable block size. The interleaver 201B block size may be determined by the block size in the outer code in the block encoder 201A, which may be configured for a desired quality of service (QoS). The modulator 201 may perform a plurality of operations on the signal to be transmitted such as source coding and multiplexing, encoding, interleaving, and may enable retransmission, for example.

The modulation may comprise single carrier, OFDM, and/or SCDMA. The cable plant 203 may comprise a hybrid fiber cable (HFC) system and may comprise fiber optic and coaxial cables with associated transmitter and receiver electronics and optoelectronics for communicating signals between the modulator 201 and the demodulator 207.

The in-home network 205 may comprise cable infrastructure in a user's home, and may comprise the demodulator 207 which may be integrated in a set top box, for example. The in-home network 205 may also comprise coaxial cable, cable modem, wired and/or wireless routers, switches, and/or other cabling for example.

The demodulator 207 may comprise suitable circuitry, logic, and/or code that may enable demodulating a signal received from the modulator 201 via the cable plant 203 and the in-home network 205. The demodulator 207 may comprise FEC components comprising a convolutional decoder 207A, a de-interleaver 207B, and a block demodulator 207C.

The downstream transmission 200 may comprise forward error correction (FEC) using low-density parity check (LDPC) code. In an embodiment of the invention, the LDPC code from DVB-S2 may be utilized, or a shorter code may be utilized, 43,800 bits long versus 64,800 bits long, for example, for reduced complexity. In another embodiment of the invention, the DVB-S2 FEC with higher word constellation may be utilized.

The echo channel in cable broadcasting may be most effectively combated with single carrier modulation with a decision feedback equalizer (DFE), which may be utilized to determine a tradeoff between the coding gain and the benefit of a code such as an LDPC code with mitigating echo channel. In various exemplary embodiments of the invention, an echo channel and converged DFE tasks, ideal timing and carrier recovery with approximately 10 db ripple caused by echo, which may comprise an extremely harsh cable environment, may result in a 1.6 db loss. In instances where the code is shortened to ½ the size, without puncturing, the code rate drops from 90% to 80%, for example, but the codeword error rate may be presumably lower. In instances where each codeword is now ½ the length of the original, if a decoder may be implemented which puts the "0's" back in, and then performs decoding, there may be twice as many full length codewords to decode in the same amount of time as allowed in the non-shortened case. In decoding the RS codes, the shortening, may allow the decoder to simply stop the various steps in the decoding algorithm once the "zero bits" are reached, so the decoder does not have to actually deal with the restored full length codewords.

Puncture codes may comprise shortened codes where the parity check matrix has eliminated parity checks. However, deleting too many parity checks may destroy the benefit of the code, which may only correct very few errors.

In an embodiment of the invention, one constituent or trellis code may be utilized with a plurality of different interleavers to support different code block sizes without increasing the complexity. However, in instances where the block size may become too long to provide a required data throughput, parallel decoding may be used. In this instance, the complexity may depend on the number of parallel decoders, but shortening may allow idling of some decoders.

An outer code technique, such as LDPC or RS, for example, may be utilized. Various embodiments of the invention may also utilize an outer code that may be specifically designed to combat burst noise for all types of service that may be carried by the downstream transmission 200. An additional burst may be transmitted so that after a transmitter gets 2-4 grants to collect and then may calculate parity grants via the redundant transmission or a plurality of burst transmissions. Thus, in instances where one entire burst may be wiped out, there may be enough parity with the 5 out of 6 good bursts that got through to reconstruct the one that was lost. This technique may be effective in high burst noise environments and even with recurring burst noise.

The outer codes may enable erasure detection, without the need for long and complex error correction codes. For example, with the downstream transmission 200, there may be 27 codewords that may be sent downstream including error corrected codewords with an amount of parity included. In instances where any one of these codewords experience burst noise, then that codeword may be severely damaged and probably not correctable. However, by adding an outer codeword that may be a 32 bit long Hamming code, one error or two erasures may be corrected. For example, in instances where two of the 20 codewords are damaged by burst noise, these Hamming outer codes would be able to recover the two damaged codewords.

Outer coding and retransmission may comprise outer code across multiple codewords, such that they may be "covered" by an outer code codeword. The codewords may be decoded in parallel, until enough of the covered inner codewords may be decoded so that the outer codeword may be developed. An outer codeword may comprise a number of codes, and may enable erasure decoding. In an embodiment of the invention, an outer codeword may be iteratively decoded, and may begin with some inner codewords still processing, either using erasures or using some inner codewords with errors.

In an embodiment of the invention, a decoding implementation may work on multiple codewords at once, perhaps with an outer code. If the parity checks may be resolved such that it appears there are very few bit errors relative to the percentage of total information bits in a codeword, then with an outer code, this codeword may be considered adequate and the decoding resource applied to remaining codewords. Accordingly, codewords that are completed allow decoding resources to be diverted to codewords still being "worked."

This type of implementation allows a "statistical multiplexing" type of benefit for the decoder complexity and the "max iterations" limit. For example, in instances where 30 may be the maximum iterations for a single codeword, but if viewed as 10 codewords in a set, there may be 300 maximum iterations for the set of 10. Thus, when one codeword in 10,000 may be difficult to decode, most of the 300 iterations may be applied to that one codeword. With outer coding, and confidence that this 1 in 10,000 codeword may be decoded to a BER of $1 \times 10^{-4}$ or even $1 \times 10^{-3}$, then this may be acceptable for the outer code. By utilizing retransmission, identifying 1% of the troubled codeword's bits in this case may also be sufficient.

In another embodiment of the invention, retransmission of errored segments at the PHY layer may be utilized. In this manner, the requirements for very long interleavers may be alleviated in the FEC for broadcast TV applications, for example. Retransmission may combat impulse/burst noise, but may also improve additive white Gaussian noise (AWGN) performance as well. The demodulator 207 may enable the determination of an error probability for decoded bits. In instances where an error probability is above a configurable threshold, determined by QoS requirements, for example, the demodulator may communicate a retransmission request to the modulator 201.

In instances where retransmission is utilized, after some number of inner codewords may be decoded, the demodulator 207 may request retransmission of some of the remaining inner codewords and may combine new information if beneficial.

In instances where retransmission is not available, the choice of outer coding may be different such that longer codes may be used since memory for retransmission may not then be needed. In instance where burst noise is present, the outer coding may be different, with and without retransmission. A minimum amount of burst noise may be considered always present, for example DFE in demodulation.

In various embodiments of the invention, the LDPC codewords are robust with AWGN and with some single-symbol noise hits akin to DFE error propagation. The LDPC codewords are robust with relatively long lasting minor rotation due to phase noise or gain, and also with impulse events, of various size and rate of occurrence depending on model selected, and lasting five or so symbols. The LDPC codewords are also robust with burst events of various sizes and rates of occurrence depending on a selected model, but much longer and less frequent than impulse noise.

Shannon limits may be applicable to systems without feedback from the receiver to the transmitter, and the performance of the downstream transmission 200 may be configured to allow feedback from the receiver to the transmitter, to outperform the Shannon limits which apply only to systems without feedback.

The feedback mechanism, may comprise a plurality of implementations, but if a noisy block is detected, as a segment of a long codeword, the FEC decoder may be able to isolate this subset block during the decoding iterations, and then could send this location back to the transmitter for retransmission of the bits. The same symbols may be retransmitted, or in general could even use a different modulation/FEC to retransmit.

In another embodiment of the invention, an impacted subset block may be identified using primarily slicer data and monitoring. Similarly, information bits, or a subgrouping of information bits, may be identified for retransmission that have the most uncertainty in the last iterations, and retransmission may be requested of a subgroup with these bits. Depending on which method of identifying impacted data, the decoder may be able to provide the pointers required, and these pointers are utilized to improve the new transmissions.

In instances where the LDPCC may fail to decode due to errors in the bitstream, as opposed to decoding the wrong codeword, this information may be utilized to trigger a retransmission request. For example, if an outer code is able to correct one bit error in a block of 32, or correct two erasures in a block of 32, then decoding 30 LDPC codewords out of 32 covered by the LDPC outer coding may be sufficient for low BER. If 2 of the 32 codewords may utilize too many iterations, the iterations may be stopped when the 30th LDPC block completes, in instances where the LDPC blocks always fail-to-decode, rather than incorrectly decode.

Accordingly, it may not be necessary to find 100% of the "errors" made in a first transmission, it may not even be necessary to find with certainty the least reliable received symbols or bits, and there may be the likelihood, or near certainty for large blocks, that at least one or some errored bits will appear more likely than some of the correct symbols or bits. Thus, identifying a set of "troubled" bits, and getting them retransmitted, for another decoding process, in a system where most bits are getting through correctly, may provide greatly improved performance.

If, in a small number of iterations, the least reliable bits may be isolated in the decoding to fewer than 1% of the information bits, and these may then be signaled for retransmission, there may be a large benefit in terms of the downstream bandwidth burned for feedback. This may greatly increase system efficiency since even if every codeword required feedback, limiting the number to 1% makes the system efficient.

Protection may also be provided in the outer coding against the uncoded bits in the inner (column) decoding, since the additional coded bits (in a plurality of additional parity columns transmitted, 6 or 7, for example, may also use the uncoded bits computed via the same row parity. After decoding the rows which cover the 256QAM LSBs, which may comprise the coded bits of the column coding, the 256QAM symbols that were impacted by the burst noise may be identified. A "region" of symbols may also be identified, in instances where some of the symbols during the burst noise event, or at least the 4 LSBs of some symbols during the burst event, happened to be received correctly. With the distance 4 row encoding, these QAM symbols identified as occurring during a burst event may be erased prior to the decoding of the rows covering the 256QAM MSBs, which would still allow for full protection for many of the symbols not impacted by the burst noise, and even in the rows where an erasure occurred, a single-error correction capability may still be available from the row coding distance.

If RS is used for the row coding, then using (32, 30, 3) single error Hamming correction code, over Galois field GF(256) and shortened, will allow taking 4 LSBs of two of the QAM symbols into one RS symbol. This may reduce the number of row codes, compared to the binary Hamming, by 8, and may have all the same benefits and attributes of Hamming rows. This may provide the benefit of half the latency for the same amount of burst protection and better code rate, compared to the Hamming. The decoding complexity may be higher for the row codes with RS instead of Hamming, however. Extending the code to achieve a coding distance of 4, and allowing erasure decoding, may still be available with the RS. With the same latency as the (63, 57, 3) Hamming, and the same burst protection, but using (63, 61, 3) RS, the code rate for the additional burst protection may be 96.8%, which may comprise a beneficial option.

For larger constellation sizes than 256QAM, it may be possible that the MSBs are covered with a larger GF, to allow coverage of all the uncoded MSBs in the same number of RS symbols as the coded LSBs of the set-partitioned inner code, which may prove too complex in the decoder. However, using a different number of row codewords for the MSBs than for the LSBs, and maintaining GF(256) arithmetic, may provide an acceptable choice.

In another embodiment of the invention, PhyR, or PHY retransmission, may be utilized for retransmission in the downstream transmission 200. The Quality of Service (QoS) may be matched to the physical layer performance. Tradeoffs with a profile for a particular user with a particular application may comprise error rate, latency, data rate, and SNR for example, in a continual broadcast or transmission. With a different modulation in different bursts, the timing may be important, but in the downstream it may be possible to have the modulation go from 256QAM down to 64 QAM and/or back up again. Accordingly, the framing may need multiple FEC decoders operating in parallel because the latencies are different.

A flexible frame structure may be utilized for optimization in order to mitigate impairments in the downstream transmission 200. If a decision feedback equalizer (DFE) is utilized, a longer run of consecutive symbols of the same modulation robustness may be utilized to flush the feedback path. However, in other applications that are latency sensitive, symbols may be alternated or may have shorter runs of consecutive symbols. The number of consecutive symbols that are utilized at a given time is considered when providing a flexible framing scheme. Another aspect of flexible framing may comprise pilot symbols. In this manner, some segment or segments of the downstream transmission may be repeated, such as a sync header or other header or synchronization, followed immediately by information related to modulation and/or robustness. The information sent may comprise the lowest common denominator of modulation and robustness, which may be utilized to configure the receivers on a particular channel.

In an exemplary embodiment of the invention, a frame header may be provided which may be, at most, as dense as the least capable receiver on the channel. Thus, the frame header will also be at least as long as the furthest non-zero DFE coefficient of the receivers "taking" that channel. In general, a frame that may be at most 256QAM and at least as long as the DFE length may be implemented. In this manner, a frame header, which every receiver may be able to read, may be utilized to "flush" the DFE errors from the symbols preceding the frame header. The frame header may be followed by the symbols aimed for the lowest capable receivers. The density of the modulation may be increased as the frame progresses and the process may be repeated in a subsequent frame. The frames may adapt as time goes on, and the traffic aimed at the various receivers may vary with time.

The frame headers may comprise symbols with no information ("pilots") to aid synchronization, and/or very few bits, also thereby aiding synchronization. Bits in the frame header which control the frame formatting may be very robust and repeated several times before they become in use. The receiver may always know the density of the symbols it is receiving, once it has synchronized with the frame headers.

Frame headers may not be strictly periodically spaced in time. This may provide efficiency when the channel is aimed at only users of 1024QAM, for example, wherein the frame headers may be spaced infrequently. This may allow the system to "advertise" a highly efficient downstream. Multiplexing two or more receivers, or service flows, that require different bits/symbol in the downstream may come at a cost in efficiency, which may not comprise a serious drawback, but that the transmission may be limited to the lowest common denominator receiver or service flow in the system.

In an embodiment of the invention, probabilities may be determined for decoding error and assessing the decoding process to pull parameters out from the decoder that are indicative that certain bits may be struggling. Certain bits where the certainty may be low may be identified and a message may be sent back to the transmitter to retransmit the problem bits.

During the transmission where symbols may be falling very close to decision thresholds, these symbols may be retransmitted. In an embodiment of the invention, by monitoring the output of the demodulator 207, a decision could be made one symbol at a time, in a block, a whole subset of the codeword, or a whole codeword and asking for retransmissions of parts of a codeword.

In an embodiment of the invention, variable coding may be utilized, such that different services, such as TV broadcast, VoD, data, voice, for example, may have different tradeoffs of error rate versus latency. With regards to latency, the most complex code may be used for applications that are not sensitive to latency such as file transfer and video broadcast. The downstream transmission 200 may also be operable to reduce the latency associated with latency sensitive applications, such as voice.

Variable modulation may be utilized for different services. For example, 2048-QAM for TV broadcast and 256-QAM for voice. This variable modulation may occur in the same physical channel, or a single modulation format may be isolated to a given physical channel.

In another embodiment of the invention, channel bonding similar to data over cable service interface specification (DOCSIS) 3.0 may be utilized. This may provide increased throughput via statistical multiplexing as well as providing wider transmission bandwidth.

In an embodiment of the invention, iterative decoding, architecting the decoder, selecting the FEC type, and architecting the retransmission method and protocol, with both transmitter and receiver sides impacted, may be utilized. Additionally, combining the FEC design, decoder architecture, and retransmission choices to be optimized for taking advantage of combined retransmission and iterative decoding, all while supporting a multiplicity of error rates and PHY channel conditions may be enabled. Accordingly, this may provide, in a single channel, a flexible PHY which simultaneously supports multiple applications, each with unique QoS, such as throughput, latency, error rate. This enables the mitigation of a variety of channel impairments which may differ even among users of the same channel, operating as both broadcast and unicast to individual receivers in a one-to-many network.

Additionally, the downstream transmission 200 may enable an outer decoder to variably weight bit probabilities at its input. For additive white Gaussian noise (AWGN) the MSBs of uncoded bits may have higher likelihood, depending on the location of the selected symbol. Furthermore, uncoded bits have lower bit error rate (BER) than coded bits, even when the block may be decoded in error. Similarly, codewords terminating in their decoding may be "certain". The MSBs of burst noise-affected uncoded bits may be more likely in error, but slicer information may be coupled in, for outer code use as well.

An alternative to single carrier may comprise orthogonal frequency division multiplexing (OFDM) which may comprise a multiplicity of different carriers or tones, 1024 QAM for example. In this manner, there may be 1024 harmonically related signals that are evenly spaced to the frequency domain tone and may have reduced power, but comprises many hundreds of tones, some of which may be used for pilot signaling to provide synchronization to the other tones, such as for the beginning and the ending of symbol times, and to determine the carrier frequencies, for example. Similarly, some of the tones may be utilized for channel estimation.

In an exemplary embodiment of the invention, where there may be three different services to support users. One user may want to watch a TV program, a second user may want to perform a file download, and a third user may be playing an Internet game, with all three on the same channel. With OFDM, for example, 400 tones may be dedicated for the TV program, with continuous broadcast. The Internet game may desire rapid response, or low latency, with a low error rate, $10^{-6}$, for example. Accordingly, if one message is delivered in error, it may not be significant, so 300 tones may be sufficient, and a user may only uses utilize a portion of the tones for a given period of time. This may leave approximately 200 tones for a file download.

In an embodiment of the invention, a number of tones may be "borrowed" from certain lower priority services, or lower priority users, for example. The OFDM system may be partitioned with different PHY performance and services, which may be more difficult in single carrier system because one tone could be at 256QAM and next to it could be a 64 QAM tone. However, in a receiver where one user receives 256 QAM signal, another user that is on the same channel may not have the SNR to receive the 256 QAM signal. In this instance, the system may drop down to 64 QAM, which when considering the sequence of symbols, a system may not be able to track timing with 256 QAM data surrounding 64 QAM in the midst of the data because the carrier and/or symbol timing may not be synchronized. This may cause an adaptive equalizer to diverge making bad decisions, demonstrating the difficulty of integrating a variably PHY with a single carrier.

Figure 3:
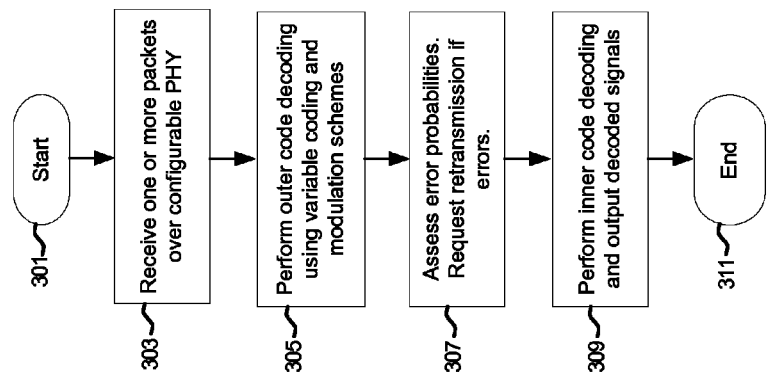
FIG. 3 is a block diagram illustrating exemplary steps for handling packets in DVB-C2, in accordance with an embodiment of the invention.

FIG. 3 is a block diagram illustrating exemplary steps for handling packets in DVB-C2, in accordance with an embodiment of the invention. The exemplary steps begin with step 301. In step 303, one or more encoded packets may be received via a PHY configured for a desired QoS. In step 305, outer coding may be performed utilizing variable coding and modulation schemes. In step 307, error probabilities may be assessed and retransmission may be requested for bits, blocks, and or codewords with high error probability. In step 309, the inner decoding may be performed and decoded output signals may be generated, followed by end step 311.

Figure 4:
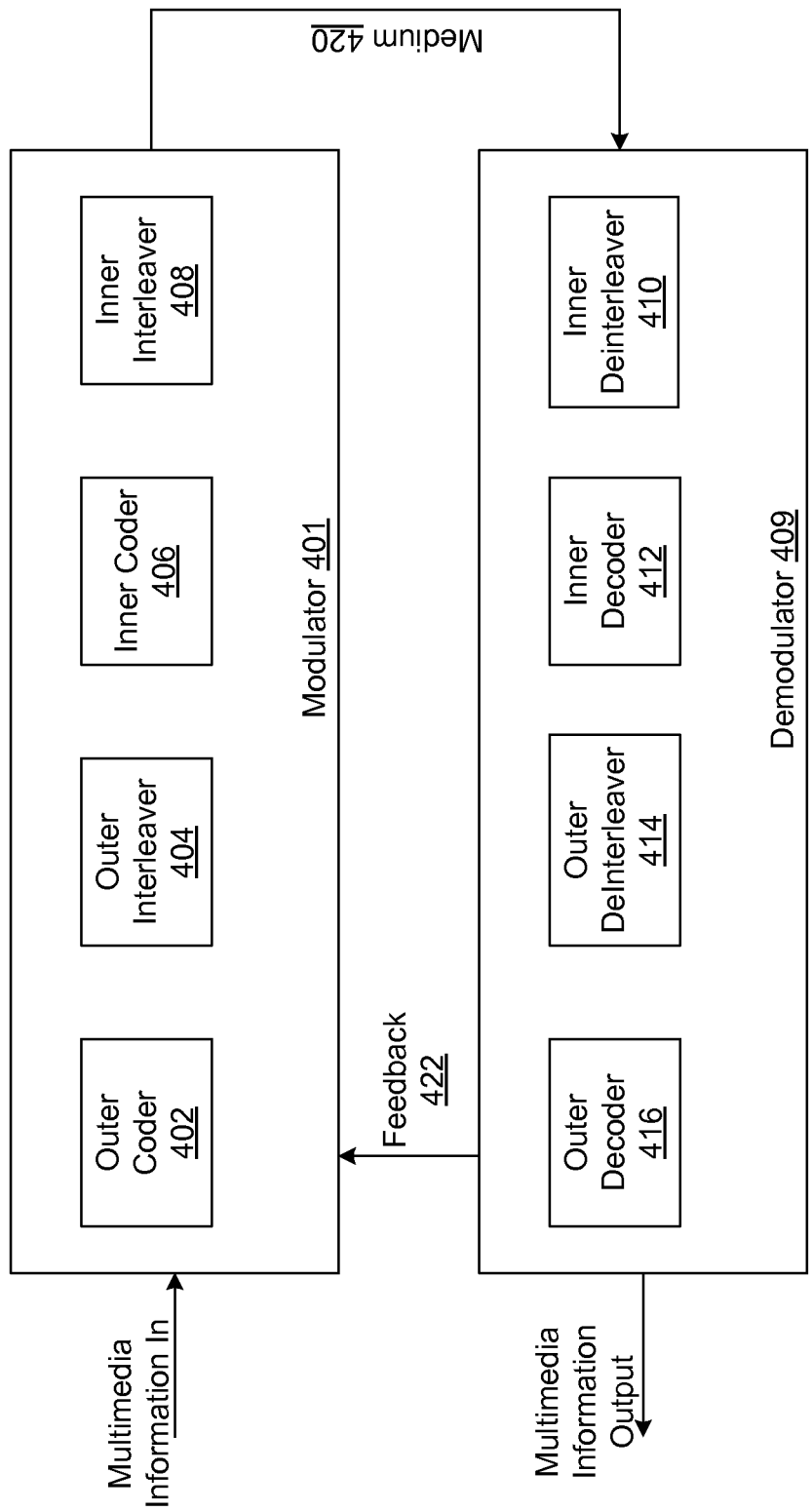
FIG. 4 is a block diagram of an exemplary digital video broadcast cable system, in accordance with an embodiment of the invention.

FIG. 4 is a block diagram of an exemplary digital video broadcast cable system, in accordance with an embodiment of the invention. Referring to FIG. 4, there is shown a modulator 401 and a demodulator 409. The modulator 401 comprises an outer coder 402, an outer interleaver 404, an inner coder 406, and an inner interleaver 408. The demodulator 409 comprise an inner deinterleaver 410, an inner decoder 412, an outer deinterleaver 414 and an outer decoder 416. There is also shown a communication medium 420 and a feedback path 422.

The modulator 401 may comprise suitable logic, circuitry and/or code that may be operable to receive input multimedia information to be coded and modulated for transmission via the communication medium 420. The multimedia information may comprise voice, video, data, and/or still images. The communication medium 420 comprises one or more of an optical medium, and electrical medium, an opto-electrical medium, and/or wired medium.

The outer coder 402 may comprise suitable logic, circuitry and/or code that may be operable to receive the input multimedia information and code it utilizing a block code as an outer code for forward error correction. In this regard, the outer coder 402 may be operable to utilize a low density parity check code or Reed-Solomon (RS) code as the block code outer coding the input multimedia information for the forward error correction. In this regard, the multimedia information may be block encoded by the outer coder 402.

The outer interleaver 404 may comprise suitable logic, circuitry and/or code that may be operable to receive an output from the outer coder 402 and outer interleave it based on a block size of the outer coder. The block encoded multimedia information from the outer coder may be outer interleaved by the outer interleaver 404, based on for example, a block size of the outer code used by the outer coder 402.

The inner coder 406 may comprise suitable logic, circuitry and/or code that may be operable to receive an output of the outer interleaver 404 and outer interleave this receive output. In this regard, the outer interleaved block encoded multimedia information generated from the outer interleaver 404 may be inner coded by the inner coder 406, utilizing for example, convolutional coding.

The inner interleaver 408 may comprise suitable logic, circuitry and/or code that may be operable to receive an output of the inner coder 406 and inner interleave it. In this regard, the inner interleaver 408 may generate inner interleaved inner coded outer interleaved block encoded multimedia information. The output from the inner interleaver 408 may be modulated by the modulator 401 and transmitted over the communication medium 420. The modulator 401 may be operable to modulate the inner interleaved inner coded outer interleaved block encoded multimedia information via a variable modulation scheme. The variable modulation scheme comprises single carrier modulation, orthogonal frequency division modulation, synchronous code division multiple access, and quadrature amplitude modulation (QAM) comprising at least 256 constellations.

The inner deinterleaver 410 may comprise suitable logic, circuitry and/or code that may be operable to receive an output of the inner interleaver 408 via the communication medium 420 and inner deinterleave this received output.

The inner decoder 412 may comprise suitable logic, circuitry and/or code that may be operable to receive an output of the inner deinterleaver 410 and inner deinterleave this received output.

The outer deinterleaver 414 may comprise suitable logic, circuitry and/or code that may be operable to receive an output of the inner decoder 412 and outer deinterleave and outer deinterleave this received output.

The outer decoder 416 may comprise suitable logic, circuitry and/or code that may be operable to receive and output of the outer deinterleaver 414 and outer decode this received output. The output of the demodulator 409 may comprise output multimedia information.

The demodulator 409 may also comprise suitable logic circuitry and/or code that may be operable to determine parity bits for retransmission, retransmission block size, and/or retransmission times. This information may be communicated to the modulator 401 via the feedback path 422.

Figure 5:
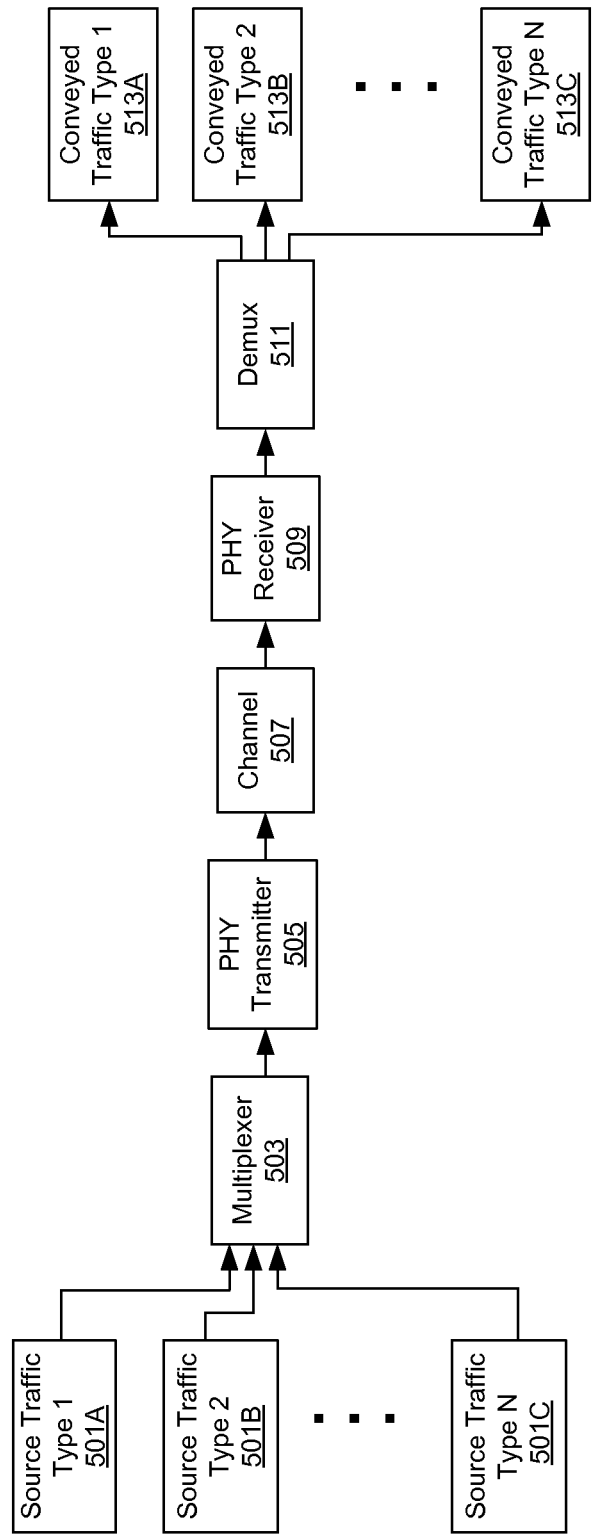
FIG. 5 is a block diagram illustrating conventional PHY layer communication, in connection with an embodiment of the invention.

FIG. 5 is a block diagram illustrating conventional PHY layer communication, in connection with an embodiment of the invention. Referring to FIG. 5, there is shown a plurality of source traffic types 1-N 501A-501C, a multiplexer 503, a PHY transmitter 505, a channel 507, a PHY receiver 509, a demultiplexer 511, and a plurality of conveyed traffic types 1-N 513A-513C.

The source traffic types 1-N 501A-501C may comprise of streams of data to be transmitted by the PHY transmitter 505 to the PHY receiver 509 via the channel 507. The source traffic types 1-N 501A-501C may be multiplexed by the multiplexer 503 prior to being communicated to the PHY transmitter 505 for transmission.

The multiplexer 503 may comprise suitable circuitry, logic, and/or code that may be operable to multiplex the plurality of source traffic types 1-N 501A-501C into a multiplexed data stream. The multiplexed data stream may be communicated from an output of the multiplexer 503 to the PHY transmitter 505.

The PHY transmitter 505 may comprise suitable circuitry, logic, and/or code that may be operable to transmit the multiplexed signals from an output of the multiplexer 503 over a channel 507. The PHY transmitter 505 may comprise electronic and/or optoelectronic devices that are operable to handle the signaling and control of electrical and/or optical signals over the communication channel 507. The channel 507 may comprise suitable circuitry, logic, and/or code that may be operable to communicate signals between the PHY transmitter 505 and the PHY receiver 509. For example, the channel may comprise fiber, coaxial and/or hybrid fiber-coaxial cable.

The PHY receiver 509 may comprise suitable circuitry, logic, and/or code that may be operable to receive signals transmitted by the PHY transmitter 505 over the channel 507. The PHY receiver 509 may comprise electronic and/or optoelectronic devices that are operable to handle the signaling and control of electrical and/or optical signals over the communication channel 507.

The demultiplexer 511 may comprise suitable circuitry, logic, and/or code that may be operable to receive the multiplexed data stream that is communicated via the channel 507 and demultiplex or separate each of the corresponding data streams comprising source traffic types 1-N 501A-501C. In this regard, the output of the demulitplexer 511 may comprise each of the plurality of conveyed traffic types 1-N 513A-513C.

In operation, the source traffic types 1-N 501A-501C may be multiplexed into a single data stream by the multiplexer 503. The multiplexed data stream may be communicated to the PHY transmitter 505, which is operable to communicate the multiplexed data stream over the channel 507. The PHY receiver 509, which may be part of a demodulator or set-top box, may be operable to receive the multiplexed data stream that is communicated via the channel 507. The output of the PHY receiver 509 may be communicated to the demultiplexer 511. The multiplexer 509 may be operable to receive the multiplexed data stream from the PHY receiver 509 and demultiplex or separate out each of the individual conveyed traffic types 1-N 513A-513C.

Figure 6:
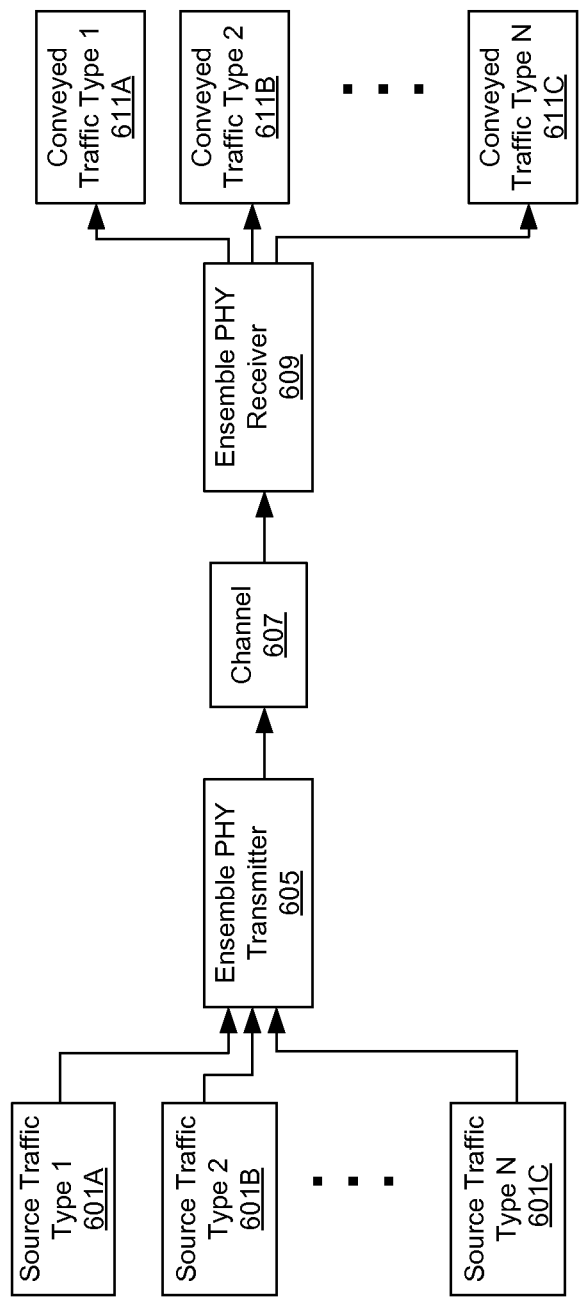
FIG. 6 is a block diagram illustrating an exemplary ensemble PHY, in accordance with an embodiment of the invention.

FIG. 6 is a block diagram illustrating an exemplary ensemble PHY, in accordance with an embodiment of the invention. Referring to FIG. 6, there is shown a plurality of source traffic types 1-N 601A-601C, an ensemble PHY transmitter 605, a channel 607, an ensemble PHY receiver 609, and a plurality of conveyed traffic types 1-N 611A-611C.

The plurality of source traffic types 1-N 601A-601C may comprise streams of data to be transmitted by the ensemble PHY transmitter 605 to the ensemble PHY receiver 609 via the communication channel 607.

The ensemble PHY transmitter 605 may comprise suitable circuitry, logic, and/or code that may be operable to transmit the plurality of different source traffic types 1-N 601A-601C over the channel 607. The ensemble PHY transmitter 605 may comprise electronic and/or optoelectronic devices that are operable to handle the signaling and control of electrical and/or optical signals over the communication channel 507. The ensemble PHY transmitter 605 may also comprise a plurality of encoders and symbol mappers for communicating plurality of signals.

The channel 607 may comprise suitable circuitry, logic, and/or code that may be operable to communicate a plurality of signals to the ensemble PHY receiver 609.

The ensemble PHY receiver 609 may comprise suitable circuitry, logic, and/or code that may be operable to receive a plurality of signals communicated from the ensemble PHY transmitter 605 over the channel 607. The ensemble PHY receiver 609 may comprise electronic and/or optoelectronic devices that are operable to handle the signaling and control of electrical and/or optical signals over the communication channel 507. The ensemble PHY receiver 609 may comprise a plurality of decoders for handling a plurality of signals that may comprise the conveyed traffic types 1-N 611A-611C.

Although an ensemble PHY transmitter 605, and an ensemble PHY receiver 609 is shown, the invention is not so limited. Accordingly, the ensemble PHY transmitter 605 may comprise receive capability in which case the ensemble PHY transmitter 605 may comprise an ensemble PHY transceiver. Furthermore, the ensemble PHY receiver 609 may comprise transmit capability in which case the ensemble PHY receiver 609 may comprise an ensemble PHY transceiver. In this regard, traffic may also be communicated from the ensemble PHY receiver 609 to the ensemble PHY transmitter 605 via the channel 605.

While FIG. 6 indicates a single transmitter and receiver, a receiver, such as one supporting channel bonding, for example, may receive more than one broadcast channel, and a transmitter may broadcast with its signal knowingly being received, with traffic directed to a multiplicity of receivers. Additionally, a receiver may not process all the traffic types in a channel, or channels, being received.

Figure 7:
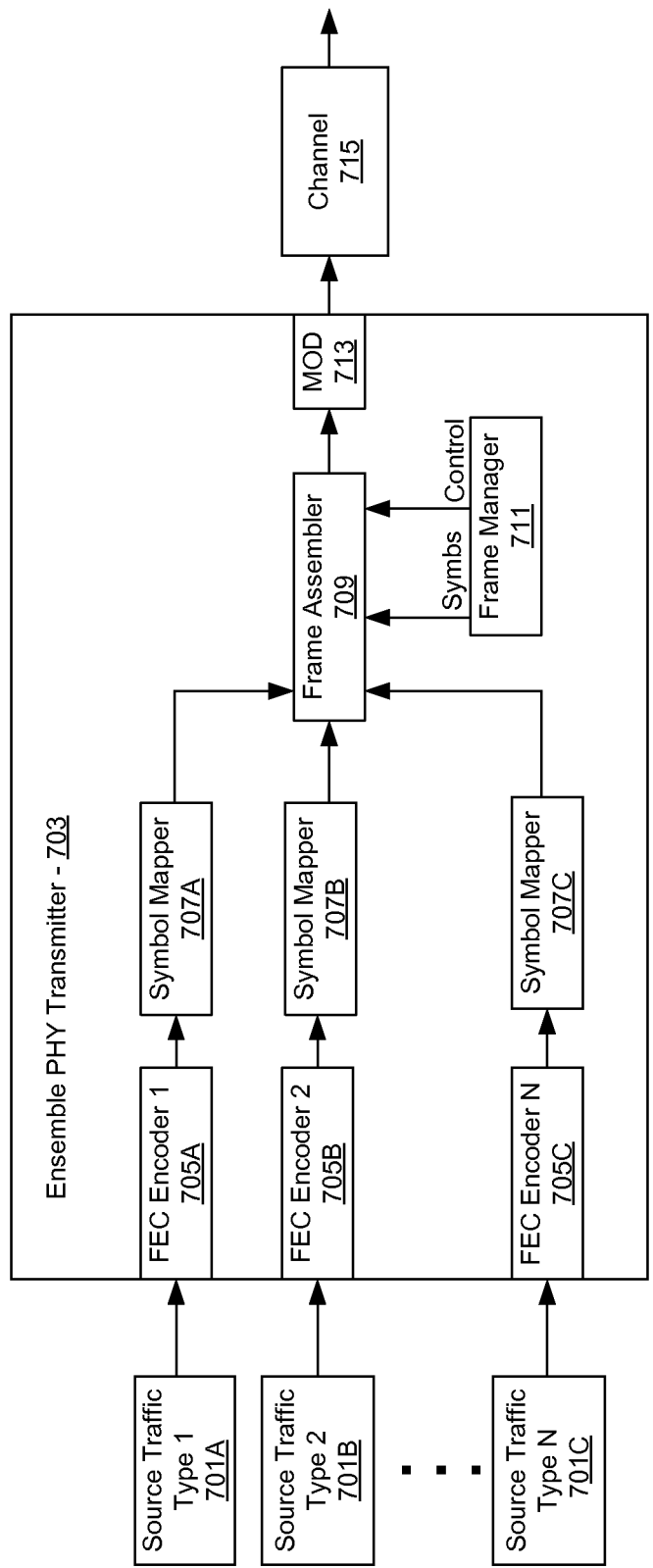
FIG. 7 is a block diagram of an exemplary ensemble PHY transmitter, in accordance with an embodiment of the invention.

FIG. 7 is a block diagram of an exemplary ensemble PHY transmitter 703, in accordance with an embodiment of the invention. Referring to FIG. 7, there is shown a plurality of source traffic types 1-N 701A-701C, an ensemble PHY transmitter 703, and a channel 715. The ensemble PHY transmitter 703 may be substantially similar to the ensemble PHY transmitter 605 and may comprise a plurality of FEC encoders 1-N 705A-705C, a plurality of symbol mappers 707A-707C, a frame assembler 709, a frame manager 711, and a modulator 713.

The FEC encoders 1-N 705A-705C may comprise suitable circuitry, logic, and/or code that may be operable to encode the source traffic types 1-N 701A-701C. The FEC encoders 1-N 705A-705C may be operable to provide error correction utilizing outer codes and/or block encoding.

The symbol mappers 707A-707C may comprise suitable circuitry, logic, and/or code that may be operable to map symbols in the encoded data generated by the FEC encoders 1-N 705A-705C.

The frame assembler 709 may comprise suitable circuitry, logic, and/or code that may be operable to receive a plurality of symbol mapped and encode signals into frames for modulation prior to transmission over the channel 715. The frame assembler 709 may also be operable to receive as inputs configuration signals for symbols and control from the frame manager 711.

The frame manager 711 may comprise suitable circuitry, logic, and/or code that may be operable to configure the frame assembler 709 for data frame generation. The modulator 713 may comprise suitable circuitry, logic, and/or code that may be operable to modulate the data frames generated by the frame assembler 709, and may communicate an output signal over the channel 715.

In operation, each FEC Encoder 1-N 705A-705C and each symbol mapper 707A-707C may condition each separate traffic type in the traffic mix for subsequent launch into the channel 715, with a particular set of impairments. Each separate PHY of the ensemble may attempt to facilitate meeting the traffic types' various QoS, by providing the most suitable PHY than would be provided when one set of PHY attributes must be shared by all traffic types. The FEC Encoders 1-N 705A-705C may comprise interleaving, and may be coordinated with knowledge of the assembling of the frames.

The frame manager 711 may determine the structure of the framing, and how to multiplex the various symbol streams into one stream. The frame manager 711 may also produce frame header information, FEC encoded, for example, and may comprise synchronization sequences and instructions guiding the organization of the framing, and may also create the instructions carried in the frame itself conveying the framing structure to the ensemble PHY receiver.

Figure 8:
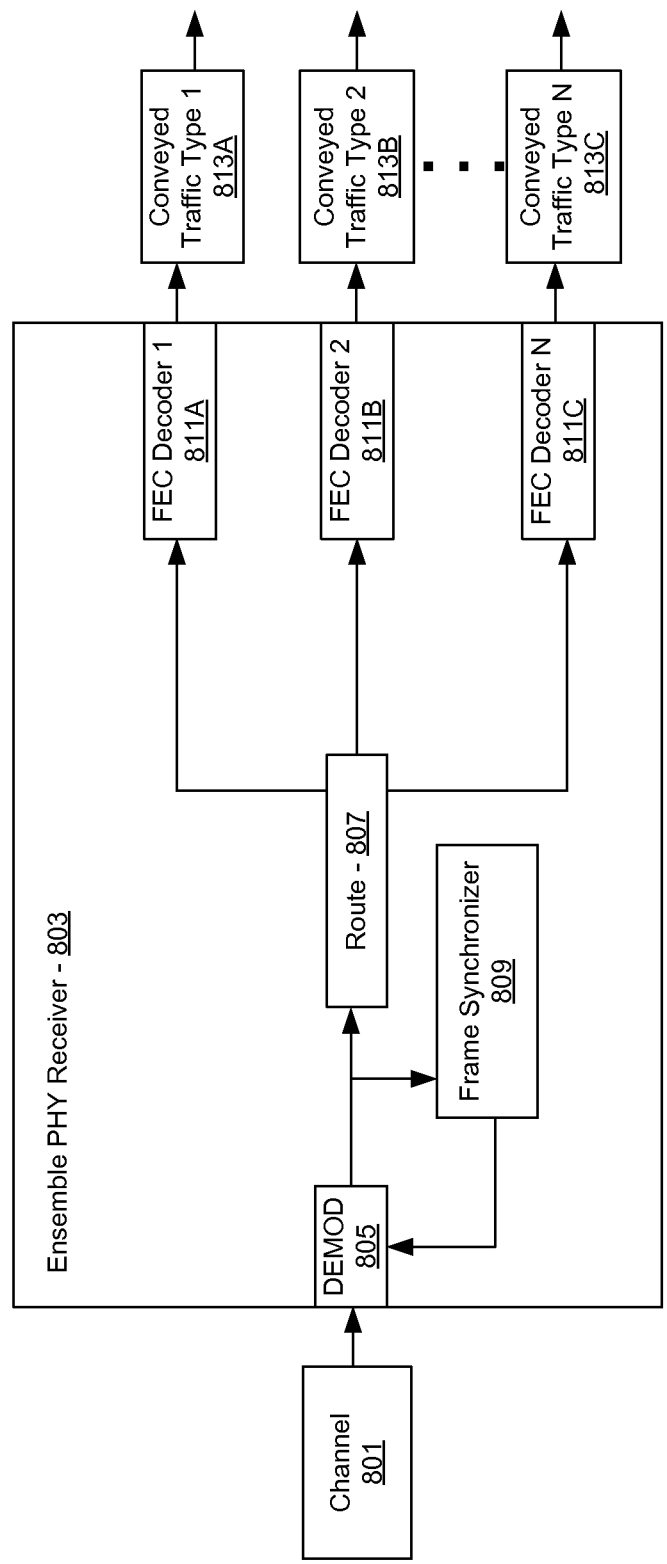
FIG. 8 is a block diagram of an exemplary ensemble PHY receiver, in accordance with an embodiment of the invention.

FIG. 8 is a block diagram of an exemplary ensemble PHY receiver, in accordance with an embodiment of the invention. Referring to FIG. 8, there is shown a channel 801, an ensemble PHY receiver 803 and a plurality of conveyed traffic types 1-N 813A-813C. The ensemble PHY receiver may comprise a demodulator 805, a route 807, a frame synchronizer 809, and FEC decoders 1-N 811A-811C.

The demodulator 805 may comprise suitable circuitry, logic, and/or code that may be operable to demodulate a modulated signal received via the channel 801. The channel 801 may be substantially similar to the channel 715, described with respect to FIG. 7. The demodulator 805 may also receive as an input, a frame synchronization signal from the frame synchronizer 809.

The route 807 may comprise suitable circuitry, logic, and/or code that may be operable to route demodulated signals to appropriate FEC decoders of the FEC decoders 1-N 811A-811C. The FEC decoders 1-N 811A-811C may comprise suitable circuitry, logic, and/or code that may be operable to decode demodulated signals received via the channel 801. The FEC decoders 1-N 811A-811C may generate the conveyed traffic types 1-N 813A-813C.

In operation, the frame synchronizer 809 may decode framing instructions for future framing, and may manage the demodulator 805 in accordance with current framing. The demodulator 805 may demodulate each symbol based on the instructions from the frame synchronizer 809. Training symbols may be included throughout a frame, and/or concentrated at the beginning and/or within a frame, to aid in demodulation and frame synchronization. Frame synchronization information may be robustly error control encoded and provided with some minimum of lead time to the ensemble PHY receiver 803.

In an embodiment of the invention, each FEC decoder 1-N 811A-811C may operate on each separate traffic type in the traffic mix, handling each to provide satisfactory QoS performance. Various retransmission schemes may be implemented with feedback from the FEC decoders 1-N 811A-811C, back to the transmitter, with feedback processing and channel not shown in FIG. 8.

Figure 9:
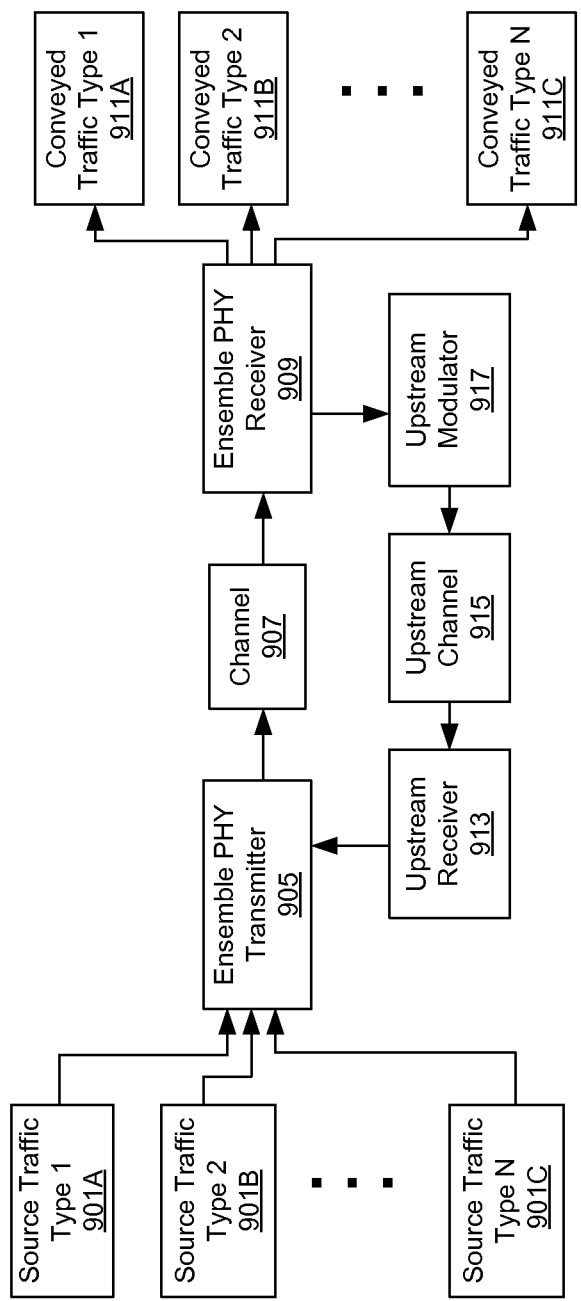
FIG. 9 is a block diagram illustrating an exemplary ensemble PHY with retransmission capability, in accordance with an embodiment of the invention.

FIG. 9 is a block diagram illustrating an exemplary ensemble PHY with retransmission capability, in accordance with an embodiment of the invention. Referring to FIG. 9, there is shown a plurality of source traffic types 1-N 901A-901C, an ensemble PHY transmitter 905, a channel 907, an ensemble PHY receiver 909, a plurality of conveyed traffic types 1-N 911A-911C, an upstream receiver 913, an upstream channel 915, and an upstream modulator 917.

The source traffic types 1-N 901A-901C, the ensemble PHY transmitter 905, the channel 907, the ensemble PHY receiver 909, and the plurality of conveyed traffic types 1-N 911A-911C may be substantially similar to the source traffic types 1-N 601A-601C, the ensemble PHY transmitter 605, the channel 607, the ensemble PHY receiver 609, and the plurality of conveyed traffic types 1-N 611A-611C, described with respect to FIG. 6.

The upstream receiver 913 may comprise suitable circuitry, logic, and/or code that may be operable to receive signals that may be utilized to indicate data to be retransmitted by the ensemble PHY transmitter 905.

The upstream channel 915 may comprise suitable circuitry, logic, and/or code that may be operable to communicate signals from the upstream modulator 917 to the upstream receiver 913.

The upstream modulator 917 may comprise suitable circuitry, logic, and/or code that may be operable to modulate data that may need retransmission to the ensemble PHY receiver 909.

In operation, the ensemble PHY receiver 909 may determine that portions of received data may be in error, due to burst noise, for example, and may communicate identifying data to the upstream modulator which data may need to be retransmitted. The upstream modulator 917 may modulate the data to be communicated back to the ensemble PHY transmitter 905 via the upstream channel 915 and received by the upstream receiver 913.

Retransmission may comprise feeding back to a transmitter or modulator, the ID of entire, or portions of, data units received with high likelihood of error or poor quality. The IDs being utilized are thus already present in the structured transmission, and so do not have to be added as a further burden. However, this may not preclude the use of packet numbering to facilitate retransmission. The ID may comprise a mechanism for counting, such as the framing sequence. In instances where symbols may be identified, the framing may provide a ready-made vehicle for such ID. Retransmission schemes that add the ID to facilitate this type of feedback may be problematic, since it may increase the downstream data burden to carry additional numbering in the downstream. However, by utilizing the framing for the ID, for symbols, and the bit order numbering for bits within a codeword, this numbering may be utilized and not require the addition of continual downstream IDs to facilitate the feedback of the IDs and subsequent renumbering. The transmitter or modulator may respond by sending additional information. Retransmission may comprise bits within a codeword, symbols carrying bits within a codeword, portions of a codeword or complete retransmission of codeword. Burst interference or other transient impairments may impact multiple codewords, so retransmission of portions of similarly-impacted codewords may enhance performance.

Figure 10:
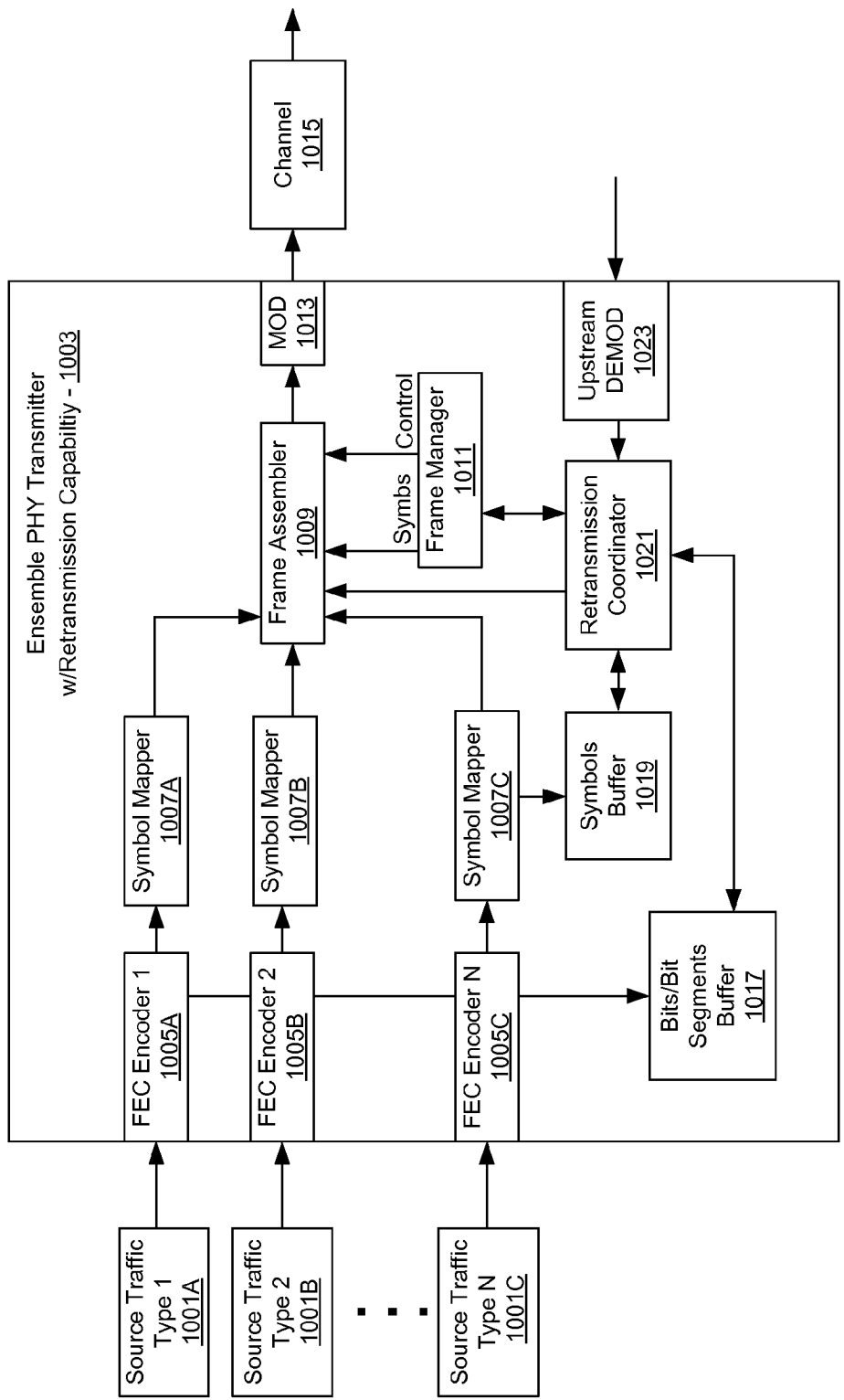
FIG. 10 is a block diagram illustrating an exemplary ensemble PHY transmitter with retransmission capability, in accordance with an embodiment of the invention.

FIG. 10 is a block diagram illustrating an exemplary ensemble PHY transmitter with retransmission capability, in accordance with an embodiment of the invention. Referring to FIG. 10, there is shown a plurality of source traffic types 1-N 1001A-1001C, an ensemble PHY transmitter 1003, and a channel 1015. The ensemble PHY transmitter 1003 may comprise a plurality of FEC encoders 1-N 1005A-1005C, a plurality of symbol mappers 1007A-1007C, a frame assembler 1009, a frame manager 1011, a modulator 1013, a bit/bit segments buffer 1017, a symbols buffer 1019, a retransmission coordinator 1021, and an upstream demodulator 1023. The plurality of source traffic types 1-N 1001A-1001C, the channel 1015, the FEC encoders 1-N 1005A-1005C, the plurality of symbol mappers 1007A-1007C, the frame assembler 1009, the frame manager 1011, and the modulator 1013 may be substantially similar to the plurality of source traffic types 1-N 701A-701C, the channel 715, the plurality of FEC encoders 1-N 705A-705C, the plurality of symbol mappers 707A-707C, the frame assembler 709, the frame manager 711, and the modulator 713.

The bits/bit segments buffer 1017 may comprise suitable circuitry, logic, and/or code that may be operable to store bits and bit segments that may require retransmission via the ensemble PHY transmitter with retransmission capability 1003. Similarly, the symbols buffer 1019 may comprise suitable circuitry, logic, and/or code that may be operable to store symbols that may require retransmission via the ensemble PHY transmitter with retransmission capability 1003.

The retransmission coordinator 1021 may comprise suitable circuitry, logic, and/or code that may be operable to coordinate components that enable retransmission such as the frame manager and the buffers 1017 and 1019.

In operation, the retransmission coordinator 1021 may receive input signals indicating data to be retransmitted from the upstream demodulator 1023. The retransmission coordinator may receive appropriate bits, bit segments, and/or symbols from the bits/bit segments buffer 1017 and/or the symbols buffer 1019 and communicate a signal comprising bits to be retransmitted to the frame assembler 1009 for transmission via the modulator 1013 over the channel 1015.

Selected portions of the ensemble PHY transmitter with retransmission capability 1003 may support traffic types which efficiently benefit from, and can allow, retransmission. Traffic types requiring extremely low error rates and allow larger latency may benefit from retransmission. Retransmission may be especially beneficial when channel impairments are transient. Retransmission allows transmitting, at a high rate, all or most of the time, and retransmitting portions which may be impacted by temporary higher level of impairments. Balance may be needed between high nominal data rate and frequency of retransmission. If too high a nominal rate is attempted, too many retransmissions may reduce efficiency. Monitoring of retransmission rates at the retransmission coordinator 1021 may lead to adjustment of nominal PHY characteristics carrying one or more of the traffic streams using retransmission.

Figure 11:
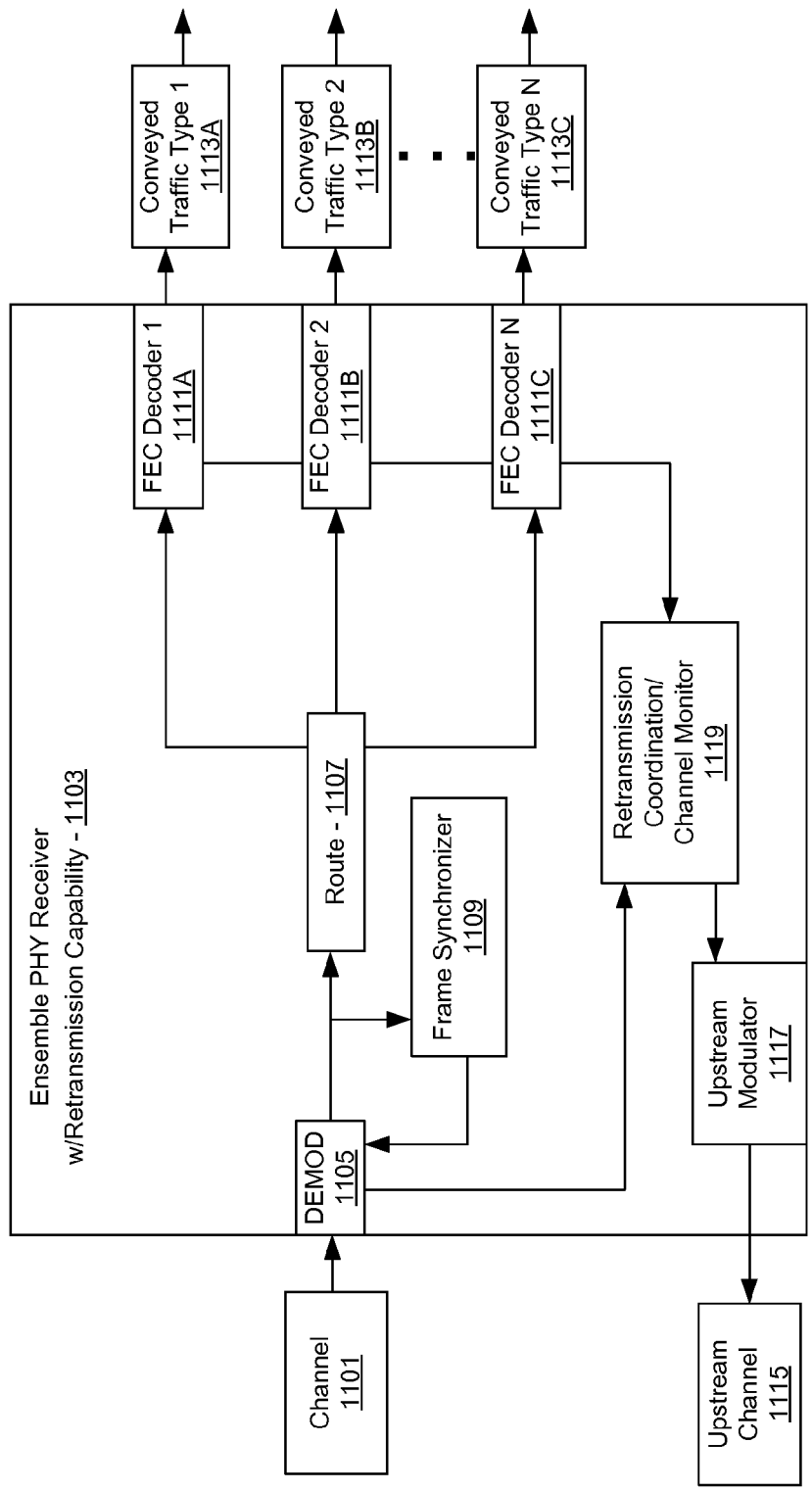
FIG. 11 is a block diagram illustrating an exemplary ensemble PHY receiver with retransmission capability 1103, in accordance with an embodiment of the invention.

FIG. 11 is a block diagram illustrating an exemplary ensemble PHY receiver with retransmission capability 1103, in accordance with an embodiment of the invention. Referring to FIG. 11, there is shown a channel 1101, an ensemble PHY receiver with retransmission capability 1103 and a plurality of conveyed traffic types 1-N 1113A-1113C. The ensemble PHY receiver with retransmission capability 1103 may comprise a demodulator 1105, a route 1107, a frame synchronizer 1109, FEC decoders 1-N 1111A-1111C, an upstream modulator 1117, and a retransmission coordinator/channel monitor 1119. The channel 1101, the ensemble PHY receiver 1103, the demodulator 1105, the route 1107, the frame synchronizer 1109, the FEC decoders 1-N 1111A-1111C and the plurality of conveyed traffic types 1-N 1113A-1113C may be substantially similar to the channel 801, the ensemble PHY receiver 803, the demodulator 805, the route 807, the frame synchronizer 809, the FEC decoders 1-N 811A-811C and the plurality of conveyed traffic types 1-N 813A-813C, described with respect to FIG. 8.

The upstream channel 1115 may comprise a modulated stream of data that may be communicated to an ensemble PHY transmitter to enable retransmission of data to be received by the ensemble PHY receiver with retransmission capability 1103.

The upstream modulator 1117 may comprise suitable circuitry, logic, and/or code that may be operable to modulate data to be communicated to an ensemble PHY transmitter via the upstream channel 1115.

The retransmission coordinator/channel monitor 1119 may comprise suitable circuitry, logic, and/or code that may be operable to determine when data may be in error and/or corrupted in the FEC decoders 1-N 111A-111C, and coordinate the communication of identifying data that may be communicated to an ensemble PHY transmitter with retransmission capability.

Retransmission comprises feeding back to a transmitter or modulator, the ID of entire, or portions of, data units received with high likelihood of error or poor quality. The IDs being utilized are thus already present in the structured transmission, and so do not have to be added as a further burden. However, this may not preclude the use of packet numbering to facilitate retransmission. The transmitter or modulator may respond by sending additional information. Retransmission may comprise bits within a codeword, symbols carrying bits within a codeword, portions of a codeword or complete retransmission of codeword. The demodulator 1105 and the FEC decoders 1-N 1111A-111C may be equipped to detect symbols and bits and portions of codewords which may be estimated with relatively low likelihood.

The FEC decoders 1-N 1111A-111C capability comprises iterative decoding in which entire codewords may be deemed struggling, or portions within such a codeword may be identified as low likelihood. An iterative decoder may be identified as struggling when a given number of iterations has not produced a result, or in combination with likelihoods of segments being too low and/or in combination with demodulator 1105 and the retransmission coordinator/channel monitor 1119 assigning low likelihood to symbols, or to an entire channel, impacting bits currently within the decoder. Decoders supporting retransmission may utilize subsequent new information, either completely discarding prior reception and results, or incorporating new reception with prior results.

Burst interference or other transient impairments may impact multiple codewords, so retransmission of portions of similarly-impacted codewords may enhance performance. Selected portions of the ensemble PHY receiver with retransmission capability 1103 may support traffic types that efficiently benefit from, and can allow, retransmission. Traffic types requiring extremely low error rates and allow larger latency may benefit from retransmission. Retransmission may be especially beneficial when channel impairments are transient. Retransmission may allow transmitting at a high rate all or most of the time, and retransmitting portions which are impacted by temporary higher level of impairments. Balance may be needed between high nominal data rate and frequency of retransmission. If too high a nominal rate is attempted, too many retransmissions may reduce efficiency. Monitoring of retransmission rates at the retransmission coordinator/channel monitor 1119 may lead to adjustment of nominal PHY characteristics carrying one or more of the traffic streams using retransmission.

Figure 12:
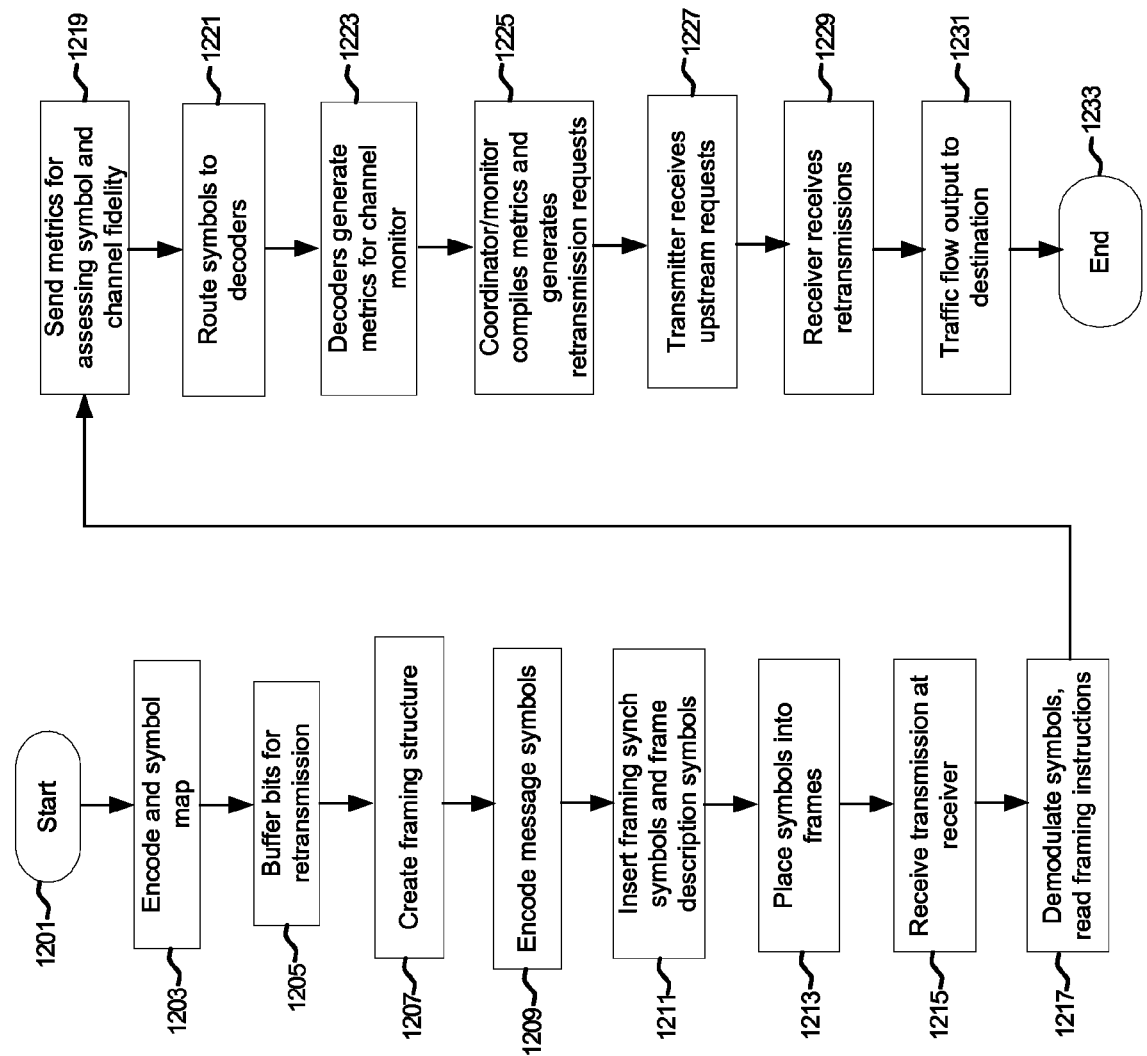
FIG. 12 is a flow diagram illustrating exemplary steps for retransmission in DVB-C2, in accordance with an embodiment of the invention.

FIG. 12 is a flow diagram illustrating exemplary steps for retransmission in DVB-C2, in accordance with an embodiment of the invention. The exemplary steps begin with step 1101. In step 1203, encoding and symbol mapping data from various traffic types separately may be performed followed by step 1205 where the bits and/or symbols may be buffered in the transmit PHY's which allow retransmission. In step 1207, a framing structure may be created from within the parameters of a flexible frame, and in step 1209 message symbols may be encoded describing the frame to the various receivers. In step 1211 framing synchronization symbols and frame description symbols (messages) may be inserted and sent to the various receivers describing this and/or subsequent frames. The current frame may have been defined in previous frames, and a "change frame" set of bits may be used to define for the receivers that a change in the framing is imminent.

In step 1213, symbols, of different constellation sizes, from separately encoded traffic types, may be placed into the frame for transmission, followed by step 1215 where the transmission may be received at the receiver after the signal has traversed the channel. In step 1217, the symbols may be demodulated, the framing instructions may be read and followed, and metrics useful for assessing symbol and channel fidelity may be assigned. The demodulator 1105 may flywheel through symbols where symbol constellation density is too dense for nominal accurate reception, based on signals from the frame synchronizer 1109. In step 1219, metrics useful for assessing symbol and channel fidelity may be sent to the channel monitor 1119 with timing information. In step 1221, symbols may be routed to appropriate decoders based on framing instructions where some symbols may be associated with traffic flows aimed at other receivers, and may be potentially used in the receiver demodulator 1105 for channel assessment, but decoding may not be required to be supported.

In step 1223, metrics may be generated within decoders 1111A-111C indicating difficulty or low likelihood of portions of messages and/or codewords, and sending to Channel Monitor, with IDs of locations of bits or symbols associated with metrics. IN step 1225, the retransmission coordination/channel monitor 1119 may compile metrics and assess channel fidelity as a function of time for a received signal. The retransmission coordination/channel monitor 1119 may also formulate and output retransmission requests, with specific IDs, for traffic flows whose PHYs support retransmission and where retransmission may be needed. In step 1227 the transmitter 1003 may receive, via upstream channel, requests/commands for retransmission, and may respond with retransmissions inserted into the subsequent downstream, framing at appropriate locations. In step 1229, the receiver 1103 may receive retransmissions and incorporate them into further decoding of the affected traffic flows. In step 1231, each traffic flow supported in a receiver may be output to a destination for the traffic flow, followed by end step 1233.

Various exemplary embodiments of the invention may comprise comprising coding multimedia information for transmission in a digital video broadcast cable system, wherein the coding utilizes a block code as an outer code for forward error correction. The multimedia information may comprise voice, video, data, and/or still images. A low density parity check code or Reed-Solomon (RS) code may be utilized as the block code for the outer code for the forward error correction. The multimedia information may be block encoded by the block coder 402 utilizing the block code. The block encoded multimedia information may be outer interleaved by the outer interleaver 404, based on for example, a block size of the outer code. The outer interleaved block encoded multimedia information may be inner coded by the inner coder 406, utilizing for example, convolutional coding.

The inner coded outer interleaved block encoded multimedia information may be inner interleaved by the inner interleaver 408. The inner interleaved inner coded outer interleaved block encoded multimedia information may be modulated via a variable modulation scheme by the modulator 401. The variable modulation scheme comprises single carrier modulation, orthogonal frequency division modulation, synchronous code division multiple access, and quadrature amplitude modulation (QAM) comprising at least 256 constellations.

The modulated inner interleaved the inner coded outer interleaved block encoded multimedia information maybe transmitted by the modulator 401 via the communication medium 420 within the digital video broadcast cable system. The communication medium 420 comprises optical, electrical, opto-electrical, and/or wired medium. The transmitted modulated inner interleaved the inner coded outer interleaved block encoded multimedia information is decoded or demodulated via the demodulator 409, which may comprise a receiver such as a cable set-top box (STB). The transmitted modulated inner interleaved the inner coded outer interleaved block encoded multimedia information is inner deinterleaved by the inner deinterleaver 410, inner decoded by the inner decoder 412, outer interleaved by the outer interleaver 414, and outer decoded by the outer decoder 416, respectively, during the decoding. Error information from the decoding may be fed back from the demodulator 409 via the feedback path 422 for use by the modulator 401 for coding of the multimedia information. Quality of service (QoS) information from the decoding may also be fed back from the demodulator 409 via the feedback path 422 for use by the modulator 401 for coding of the multimedia information.

In another embodiment of the invention, an ensemble PHY transmitter may encode and transmit N separate traffic types each with its own PHY characteristics of latency, throughput or data rate, and error performance and robustness, while a given ensemble PHY receiver may decode and process only M, with M<N, for example, separate traffic types. Accordingly, some receivers may not be capable of processing the full rate and variety of which a given ensemble PHY transmitter may be capable to generate, but the ensemble PHY receiver will still be capable of receiving a subset of the traffic within the ensemble traffic mix.

In an embodiment of the invention, a method and system is disclosed for receiving, in a DVB-C2 downstream transmission, data encoded utilizing variable encoding, variable modulation and outer codes via a physical layer matched to a desired quality of service. An error probability may be determined for the received data and retransmission of portions of the data with error probability above an error threshold may be requested. The variable modulation may comprise single carrier modulation, orthogonal frequency division modulation, synchronous code division multiple access, and/or 256 QAM to 2048 QAM or greater. The variable encoding may comprise forward error correction code, which may comprise low density parity check code.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for DVB-C2.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for processing signals, the method comprising:
   encoding multimedia information for transmission in a digital video broadcast cable system;
   selectively encoding a first source traffic type signal using a first forward error correction (FEC) code, selected based on a first latency requirement associated with the first source traffic type signal, to generate a first encoded signal;
   selectively encoding a second source traffic type signal using a second FEC code, selected based on a second latency requirement associated with the second source traffic type signal, to generate a second encoded signal;
   assembling a frame using the first encoded signal or a first plurality of modulation symbols corresponding thereto and the second first encoded signal or a second plurality of modulation symbols corresponding thereto; and
   transmitting the frame via a communication channel within the digital video broadcast cable system.

2. The method according to claim 1, further comprising:
   selectively symbol mapping the first encoded signal using a first constellation, selected based on the first latency requirement associated with the first source traffic type signal, to generate the first plurality of modulation symbols; and
   selectively symbol mapping the second encoded signal using a second constellation, selected based on the second latency requirement associated with the second source traffic type signal, to generate the second plurality of modulation symbols.

3. The method according to claim 1, wherein:
   the first FEC code is relatively more complex than the second FEC code; and further comprising:
   selecting the first FEC code and the second FEC code based on both the first latency requirement associated with the first source traffic type signal and the second latency requirement associated with the second source traffic type signal.

4. The method according to claim 1, wherein: further comprising:
   the encoding multimedia information including utilizing a low density parity check code or a Reed-Solomon (RS) code as a block code for an outer code for forward error correction; and further comprising.

5. The method according to claim 4, comprising outer interleaving said block encoded multimedia information.

6. The method according to claim 4, comprising outer interleaving said block encoded multimedia information based on a block size of said outer code.

7. The method according to claim 5, comprising inner coding said outer interleaved block encoded multimedia information.

8. The method according to claim 6, comprising inner coding said outer interleaved block encoded multimedia information utilizing convolutional coding.

9. The method according to claim 8, comprising inner interleaving said inner coded outer interleaved block encoded multimedia information.

10. The method according to claim 8, comprising modulating said inner interleaving said inner coded outer interleaved block encoded multimedia information via a variable modulation scheme.

11. The method according to claim 10, comprising transmitting said modulated inner interleaved said inner coded outer interleaved block encoded multimedia information via a communication medium within said digital video broadcast cable system.

12. The method according to claim 11, wherein said communication medium comprises optical, electrical, opto-electrical, and/or wired medium.

13. The method according to claim 11, wherein said transmitted modulated inner interleaved said inner coded outer interleaved block encoded multimedia information is decoded.

14. The method according to claim 13, wherein said transmitted modulated inner interleaved said inner coded outer interleaved block encoded multimedia information is inner deinterleaved, inner decoded, outer interleaved and outer decoded, respectively, during said decoding.

15. The method according to claim 13 comprising feeding back error information from said decoding for use by said coding of said multimedia information.

16. The method according to claim 13 comprising feeding back QoS information from said decoding for use by said coding of said multimedia information.

17. The method according to claim 10, wherein said variable modulation scheme comprises single carrier modulation.

18. The method according to claim 10, wherein variable modulation scheme comprises orthogonal frequency division modulation.

19. The method according to claim 10, wherein said variable modulation scheme comprises synchronous code division multiple access.

20. The method according to claim 10, wherein said variable modulation scheme comprises quadrature amplitude modulation (QAM) comprising at least 256 constellations.

21. A system for processing signals, the system comprising:
   one or more circuits for use in a digital video broadcast cable system, wherein said one or more circuits are operable to encode multimedia information for transmission in a digital video broadcast cable system, wherein said coding utilizes a block code as an outer code for forward error correction; and wherein:
   a first of the one or more circuits to selectively encode a first source traffic type signal using a first forward error correction (FEC) code, selected based on a first latency requirement associated with the first source traffic type signal, to generate a first encoded signal;
   a first of the one or more circuits to selectively encode a second source traffic type signal using a second FEC code, selected based on a second latency requirement associated with the second source traffic type signal, to generate a second encoded signal;

a frame assembler to assemble a frame using the first encoded signal or a first plurality of modulation symbols corresponding thereto and the second first encoded signal or a second plurality of modulation symbols corresponding thereto; and a modulator to transmit the frame via a communication channel within the digital video broadcast cable system.

22. The system according to claim 21, further comprising:
a first symbol mapper selectively to symbol map the first encoded signal using a first constellation, selected based on the first latency requirement associated with the first source traffic type signal, to generate the first plurality of modulation symbols; and
a second symbol mapper selectively to symbol map the second encoded signal using a second constellation, selected based on the second latency requirement associated with the second source traffic type signal, to generate the second plurality of modulation symbols.

23. The system according to claim 21,
the first FEC code is relatively more complex than the second FEC code; and
the first FEC code and the second FEC code selected based on both the first latency requirement associated with the first source traffic type signal and the second latency requirement associated with the second source traffic type signal.

24. The system according to claim 21, wherein said one or more circuits are operable to utilize a low density parity check code or a Reed-Solomon (RS) code as a block code for an outer code for forward error correction.

25. The system according to claim 24, wherein said one or more circuits are operable to outer interleave said block encoded multimedia information.

26. The system according to claim 24, wherein said one or more circuits are operable to outer interleave said block encoded multimedia information based on a block size of said outer code.

27. The system according to claim 25, wherein said one or more circuits are operable to inner code said outer interleaved block encoded multimedia information.

28. The system according to claim 26, wherein said one or more circuits are operable to inner code said outer interleaved block encoded multimedia information utilizing convolutional coding.

29. The system according to claim 28, wherein said one or more circuits are operable to inner interleave said inner coded outer interleaved block encoded multimedia information.

30. The system according to claim 28, wherein said one or more circuits are operable to modulate said inner interleaving said inner coded outer interleaved block encoded multimedia information via a variable modulation scheme.

31. The system according to claim 30, wherein said one or more circuits are operable to transmit said modulated inner interleaved said inner coded outer interleaved block encoded multimedia information via a communication medium within said digital video broadcast cable system.

32. The system according to claim 31, wherein said communication medium comprises optical, electrical, opto-electrical, and/or wired medium.

33. The system according to claim 31, wherein said transmitted modulated inner interleaved said inner coded outer interleaved block encoded multimedia information is decoded.

34. The system according to claim 33, wherein said transmitted modulated inner interleaved said inner coded outer interleaved block encoded multimedia information is inner deinterleaved, inner decoded, outer interleaved and outer decoded, respectively, during said decoding.

35. The system according to claim 33, wherein said one or more circuits are operable to feedback error information from said decoding for use by said coding of said multimedia information.

36. The system according to claim 33 wherein said one or more circuits are operable to feed back QoS information from said decoding for use by said coding of said multimedia information.

37. The system according to claim 30, wherein said variable modulation scheme comprises single carrier modulation.

38. The system according to claim 30, wherein variable modulation scheme comprises orthogonal frequency division modulation.

39. The system according to claim 30, wherein said variable modulation scheme comprises synchronous code division multiple access.

40. The system according to claim 30, wherein said variable modulation scheme comprises quadrature amplitude modulation (QAM) comprising at least 256 constellations.

41. A method for operating a communication device, the method comprising:
identifying a first latency requirement associated with a first source traffic type signal;
identifying a second latency requirement associated with a second source traffic type signal;
encoding the first traffic type signals using a first forward error correction (FEC) code selected based on a first latency requirement to generate a first encoded signal;
encoding the second traffic type signals using a second FEC code selected based on a second latency requirement to generate a second encoded signal;
assembling a frame using the first encoded signal or a first plurality of modulation symbols corresponding thereto and the second first encoded signal or a second plurality of modulation symbols corresponding thereto; and
transmitting the frame via a communication channel to at least one additional communication device.

42. The method of claim 41, wherein:
the first FEC code is relatively more complex than the second FEC code.

43. The method of claim 41, further comprising:
selecting the first FEC code and the second FEC code based on both the first latency requirement associated with the first source traffic type signal and the second latency requirement associated with the second source traffic type signal.

44. The method of claim 41, further comprising:
selectively symbol mapping the first encoded signal using a first constellation, selected based on the first latency requirement associated with the first source traffic type signal, to generate the first plurality of modulation symbols; and
selectively symbol mapping the second encoded signal using a second constellation, selected based on the second latency requirement associated with the second source traffic type signal, to generate the second plurality of modulation symbols.

45. The method of claim 44, wherein:
the first constellation having relatively more constellation points than the second constellation.

46. The method of claim 44, further comprising:
selecting the first constellation and the second constellation based on both the first latency requirement associated with the first source traffic type signal and the second latency requirement associated with the second source traffic type signal.

47. The method of claim 41, further comprising:
receiving framing structure information including at least one of frame header information and synchronization sequences; and
assembling the frame based on the framing structure information.

48. An apparatus, comprising:
a first input to receive a first source traffic type signal;
a second input to receive a second source traffic type signal;
a first forward error correction (FEC) encoder to encode the first traffic type signals using a first FEC code selected based on a first latency requirement to generate a first encoded signal;
a second FEC encoder to encode the second traffic type signals using a second FEC code selected based on a second latency requirement to generate a second encoded signal;
a frame assembler to assemble a frame using the first encoded signal or a first plurality of modulation symbols corresponding thereto and the second first encoded signal or a second plurality of modulation symbols corresponding thereto; and
a modulator to transmit the frame via a communication channel to at least one additional communication device.

49. The apparatus of claim 48, wherein:
the first FEC code is relatively more complex than the second FEC code.

50. The apparatus of claim 48, wherein:
the first FEC code and the second FEC code selected based on both the first latency requirement associated with the first source traffic type signal and the second latency requirement associated with the second source traffic type signal.

51. The apparatus of claim 48, further comprising:
a first symbol mapper selectively to symbol map the first encoded signal using a first constellation, selected based on the first latency requirement associated with the first source traffic type signal, to generate the first plurality of modulation symbols; and
a second symbol mapper selectively to symbol map the second encoded signal using a second constellation, selected based on the second latency requirement associated with the second source traffic type signal, to generate the second plurality of modulation symbols.

52. The apparatus of claim 51, wherein:
the first constellation having relatively more constellation points than the second constellation.

53. The apparatus of claim 51, wherein:
the first constellation and the second constellation selected based on both the first latency requirement associated with the first source traffic type signal and the second latency requirement associated with the second source traffic type signal.

54. The apparatus of claim 48, further comprising:
a frame manager to provide framing structure information including at least one of frame header information and synchronization sequences to the frame assembler; and
the frame assembler to assemble the frame based on the framing structure information.

* * * * *

UNITED STATES PATENT AND TRADEMARK OFFICE
CERTIFICATE OF CORRECTION

PATENT NO.         : 8,437,406 B2
APPLICATION NO.    : 12/269865
DATED              : May 7, 2013
INVENTOR(S)        : Thomas Kolze et al.

Page 1 of 1

It is certified that error appears in the above-identified patent and that said Letters Patent is hereby corrected as shown below:

In the Claims
Col. 21, line 67, in claim 4: after "correction" delete "; and further comprising"
Col. 23, line 6-7, in claim 21: replace "second first encoded signal" with "second encoded signal"
Col. 24, line 41, in claim 41: replace "second first encoded signal" with "second encoded signal"

Signed and Sealed this
Eleventh Day of March, 2014

Michelle K. Lee
*Deputy Director of the United States Patent and Trademark Office*